United States Patent
Muranaka

(10) Patent No.: US 7,382,483 B2
(45) Date of Patent: Jun. 3, 2008

(54) IMAGE FORMING APPARATUS AND IMAGE FORMING SYSTEM

(75) Inventor: Nobuyuki Muranaka, Tokyo (JP)

(73) Assignee: Oki Data Corporation, Tokyo (JP)

( * ) Notice: Subject to any disclaimer, the term of this patent is extended or adjusted under 35 U.S.C. 154(b) by 119 days.

(21) Appl. No.: 11/081,169

(22) Filed: Mar. 16, 2005

(65) Prior Publication Data

US 2005/0206951 A1    Sep. 22, 2005

(30) Foreign Application Priority Data

Mar. 18, 2004  (JP) .............................. 2004-078763

(51) Int. Cl.
*G06F 3/12* (2006.01)
(52) U.S. Cl. .................................... 358/1.15; 358/1.16
(58) Field of Classification Search ............... 358/1.14, 358/1.15, 1.16
See application file for complete search history.

(56) References Cited

U.S. PATENT DOCUMENTS

2003/0202202 A1* 10/2003 Miyata ...................... 358/1.14
2005/0195422 A1* 9/2005 Baez et al. ................. 358/1.14

FOREIGN PATENT DOCUMENTS

JP          2001-239725 A       9/2001

\* cited by examiner

*Primary Examiner*—King Y. Poon
*Assistant Examiner*—Nathan K Tyler
(74) *Attorney, Agent, or Firm*—Panitch Schwarze Belisario & Nadel LLP

(57) ABSTRACT

An image forming system includes a printer and a personal computer coupled via through a communication line. The printer includes an inquiry section that sends an inquiry to request apparatus information on the image forming apparatus. The printer includes a status detection section, a status storage section, a notification information storage section, and an information response section. The status detection section detects the status of the printer. The status storage section stores the detected status. The notification information storage section stores notification information that should be sent to the information processing apparatus. The information response section generates the apparatus information. The apparatus information includes the status and the notification information when the image forming apparatus receives the inquiry from the information processing apparatus.

9 Claims, 24 Drawing Sheets

IMAGE FORMING APPARATUS AND IMAGE FORMING SYSTEM

BACKGROUND OF THE INVENTION

1. Field of the Invention

The present invention generally relates to an image forming apparatus (e.g., printer) and an image forming system in which information can be transmitted from the image forming apparatus to users who use information processing apparatus.

2. Description of the Related Art

One conventional system configuration is such that a plurality of personal computers and a printer are linked through a network and the personal computers are always informed of the status of the printer.

Japanese Patent Laid-Open No. 2001-239725 discloses one such system. A personal computer requests a printer to send information on the current status of the printer and the printer sends the information to the personal computer. The information is displayed on a display of the personal computer. The users receive messages from the printer through, for example, an e-mail message. Such messages include a message that a system maintenance operation will be conducted at a specific date and a time and a message that the printer will be busy at a specific time frame.

The aforementioned information on the current status of the printer and messages are sent through different means, and therefore cause the following inconvenience.

E-mail messages require involvement of maintenance personnel to be sent to individual users on a recipient-to-recipient basis. Some of the users may be omitted inadvertently. One way of ensuring that the messages are delivered to individual recipients is to send the same messages a plurality of times. This increases the mail-handling time of the system and imposes a heavy load on the network. Moreover, the users receive the same e-mails many times.

Users may well forget the information sent through an e-mail if the e-mail is sent many days earlier than a scheduled event that the mail is intended to inform the users.

SUMMARY OF THE INVENTION

The present invention was made in view of the aforementioned problems.

An object of the invention is to provide an image-forming apparatus and an image-forming system in which a use can be informed of the current status of other apparatuses linked to the network and the associated information.

An image forming apparatus is coupled to an information processing apparatus via a communication line. A notification information storage section, stores notification information that should be transmitted to the information processing apparatus, the notification information being information associated with the image forming apparatus and being supplied to users of the information processing apparatus. An information response section detects that the information processing apparatus has received an inquiry from the information processing apparatus. A communication section sends the notification information to the information processing apparatus when the information response section detects the inquiry.

The image forming apparatus may further include a status detection section and a status storage section. The status detection section detects a status of the image forming apparatus. The status storage section stores the status of the image forming apparatus. When the communication section sends the notification information to the information processing apparatus, the communication section sends the notification information together with the status that indicates a current status of the image forming apparatus.

An image forming system includes an image forming apparatus such as a printer and a information processing apparatus. The image forming apparatus is coupled to the information processing apparatus via a communication line. The information processing apparatus includes an inquiry section that sends an inquiry to request apparatus information on the image forming apparatus. The image forming apparatus includes a status detection section, a status storage section, an information response section and a notification information storage section. The status detection section detects a status of the image forming apparatus. The status storage section stores the detected status. The notification information storage section stores notification information that should be sent to the information processing apparatus, the notification information being information associated with the image forming apparatus and being supplied to users of the information processing apparatus. An information response section generates the apparatus information when the image forming apparatus receives the inquiry from the information processing apparatus, the apparatus information including the status and the notification information.

The status storage section stores a terminal identification for the information processing apparatus and a notification flag that indicates whether the notification information has been sent to the information processing apparatus. If the notification flag indicates that the notification information has been sent to the information processing apparatus, the information response section generates the apparatus information that includes only the status and sends the apparatus information to the information processing apparatus.

The image forming apparatus may include a clock that generates a current date and a current time. The notification information storage section stores the notification information and a date and a time of initiation of notification on which the notification information should be sent to the information processing apparatus. The information response section generates the apparatus information that includes the notification information and the status, the apparatus information being generated after the date and time of initiation of notification and sent to the information processing apparatus.

The image forming apparatus may further include a clock that generates a current date and a current time. The notification information storage section stores the notification information, a date and a time of initiation of notification on which the notification information should be sent to the information processing apparatus, and a date and a time of completion of notification by which the notification information should have been sent to the information processing apparatus. When the current date and time are after the date and time of initiation of notification and before the date and time of completion of notification, the information response section generates the apparatus information that includes the notification information and the status, the apparatus information being sent to the information processing apparatus.

When the information response section determines that the current date and time have passed the date and time of completion of notification, the notification information in the notification information storage section is erased.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limiting the present invention, and wherein.

DETAILED DESCRIPTION OF THE INVENTION

The present invention will be described in detail with reference to the accompanying drawings. The image forming apparatus according to the invention will be described in terms of a printer. The image forming apparatus is not limited to a printer but may also be other apparatus such as a facsimile.

First Embodiment

{Construction}

Figure 1:
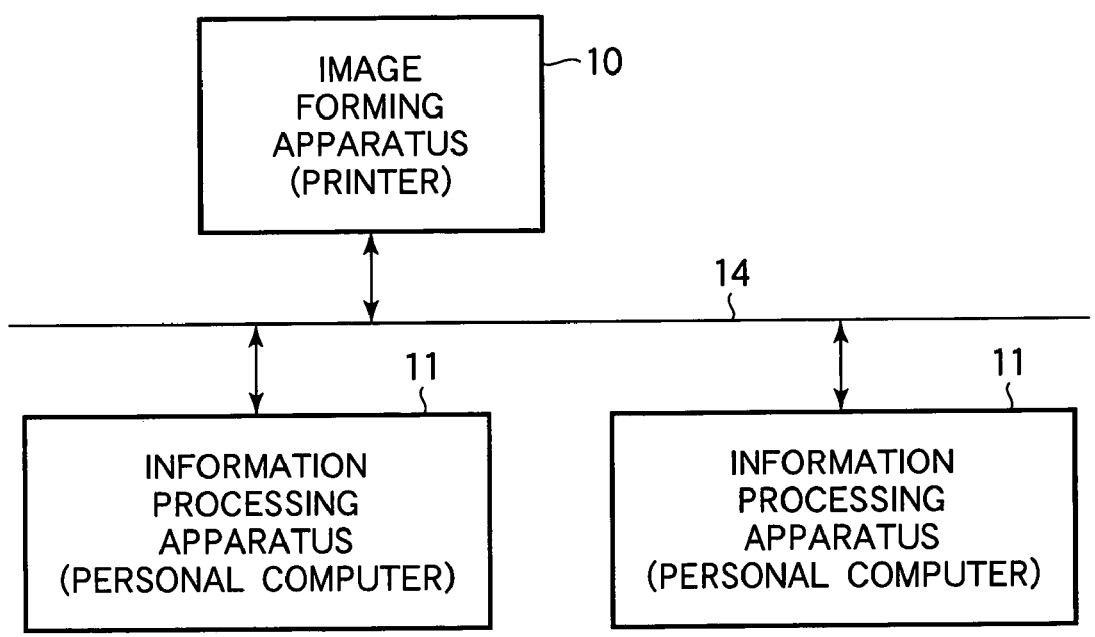
FIG. 1 illustrates an image-forming system according to a first embodiment.

In a first embodiment, a user sends a request to a printer through an information-handling apparatus such as a personal computer (referred to as PC hereinafter). In response to the request, the printer produces apparatus information based on the current status of the printer and other information that should be sent to users. FIG. 1 illustrates an image-forming system according to the first embodiment. A printer 10 is linked to personal computers through a network 14.

Figure 2:
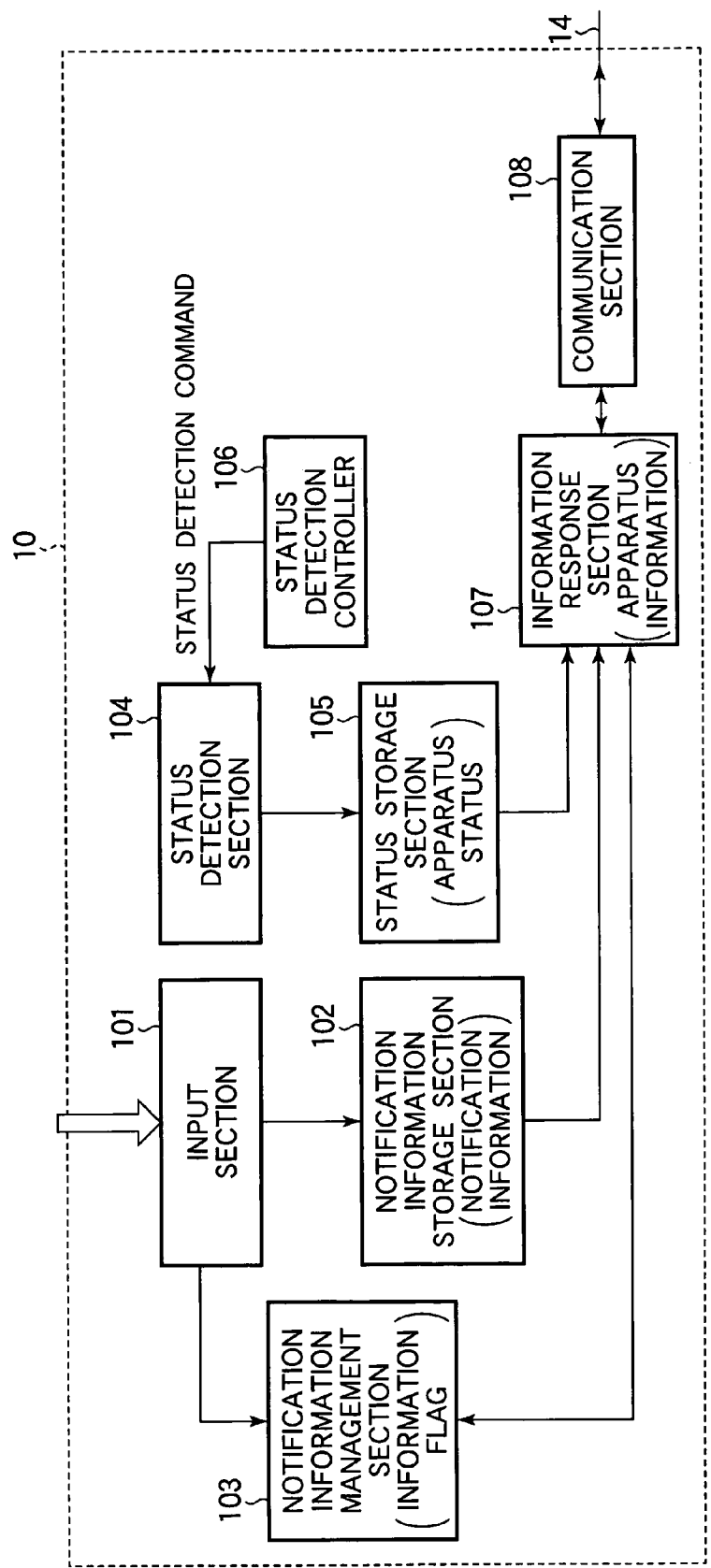
FIG. 2 is a block diagram of an image forming apparatus according to the first embodiment.

FIG. 2 is a block diagram of an image forming apparatus according to the first embodiment.

Referring to FIG. 2, the printer 10 incorporates an input section 101, a notification information storage section 102, a notification information management section 103 (information flag), a status detection section 104, a status storage section 105, a status detection controller 106, an information response section 107, and a communication section 108.

The input section 101 is a human interface that has an input key board and stores notification information inputted through the input section 101. The notification information includes a maintenance schedule, an advance notice of busy system hours, and information that prompts updating the printer driver.

The notification information storage section 102 stores items of information to be notified to the users, inputted through the input section 101. The notification information management section 103 manages information flags that indicate the presence and absence of notification information. The information flag is set to ON when the notification information is inputted and is set to OFF when the notification information is erased.

The status detection controller 106 outputs a status detection command to the status detection section 104 at regular intervals. The status detection command is a command that commands detection of status of the printer 10. The status of the printer 10 includes "ready to print", "paper-out", "toner-out/ink-out", and "paper-jam."

The status detection section 104 detects the status of the printer in response to the status detection command. The status storage section 105 stores the detected status.

Figure 3:
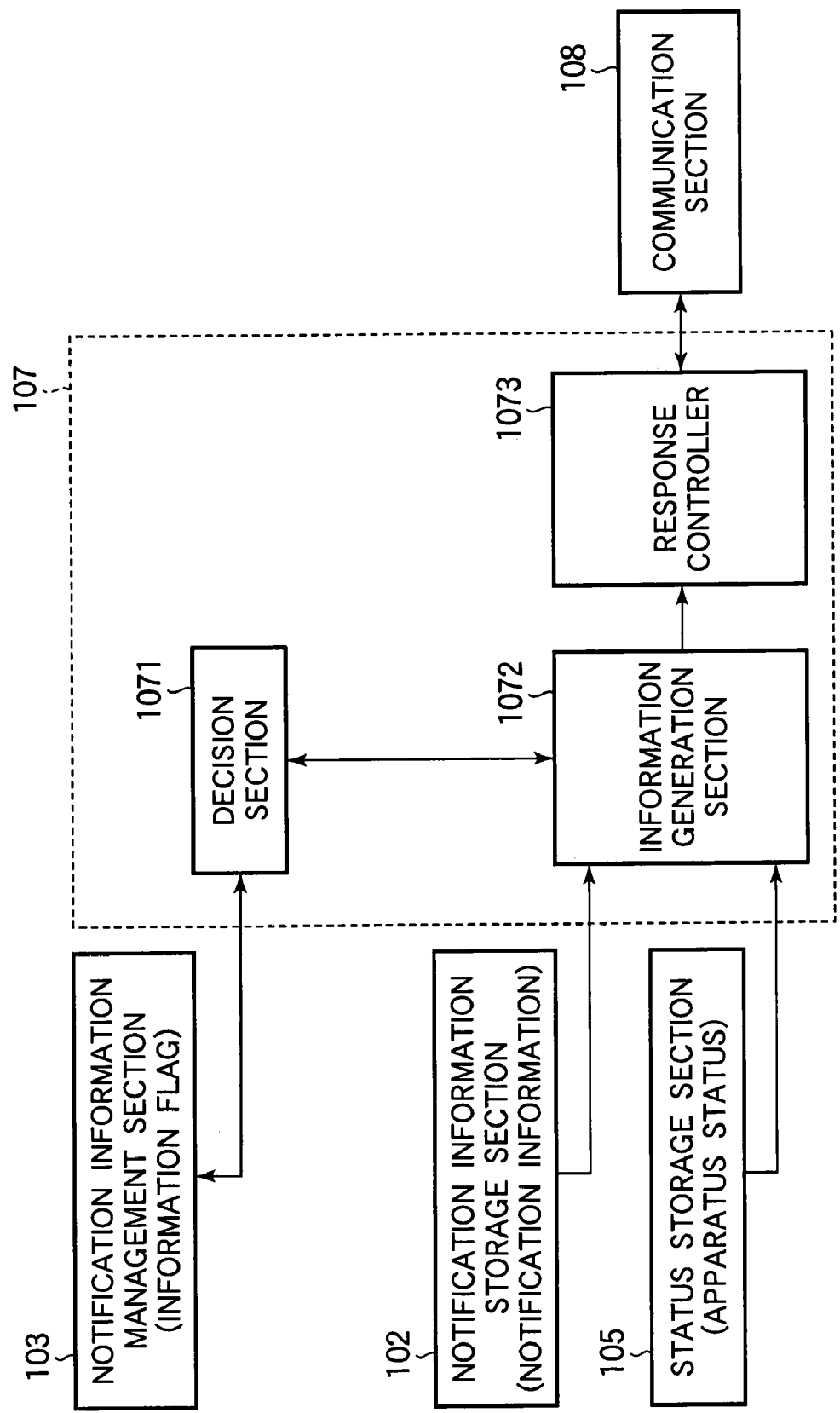
FIG. 3 is a block diagram of the information response section 107.

FIG. 3 is a block diagram of the information response section 107.

Referring to FIG. 3, the information response section 107 incorporates a decision section 1071, an information generation section 1072, and a response controller 1073.

The decision section 1071 refers to an information flag of the notification information section 103. If the information flag is ON, the decision section 1071 determines that the apparatus information is to be generated based on the notification information and apparatus status (status of the printer). If the information flag is OFF, it is determined that the apparatus information is to be generated based only on the status of the printer.

The information generation section 1072 reads the status of the printer 10 from the status storage section 105 and the notification information from the notification information storage section 102, and generates the apparatus information based on the determination of the decision section 1071.

Upon receiving an inquiry from the PC 11 via the communication section 108, the response controller 1073 reads the apparatus information from the information generation section 1072 and sends it to the communication section 108.

Figure 4:
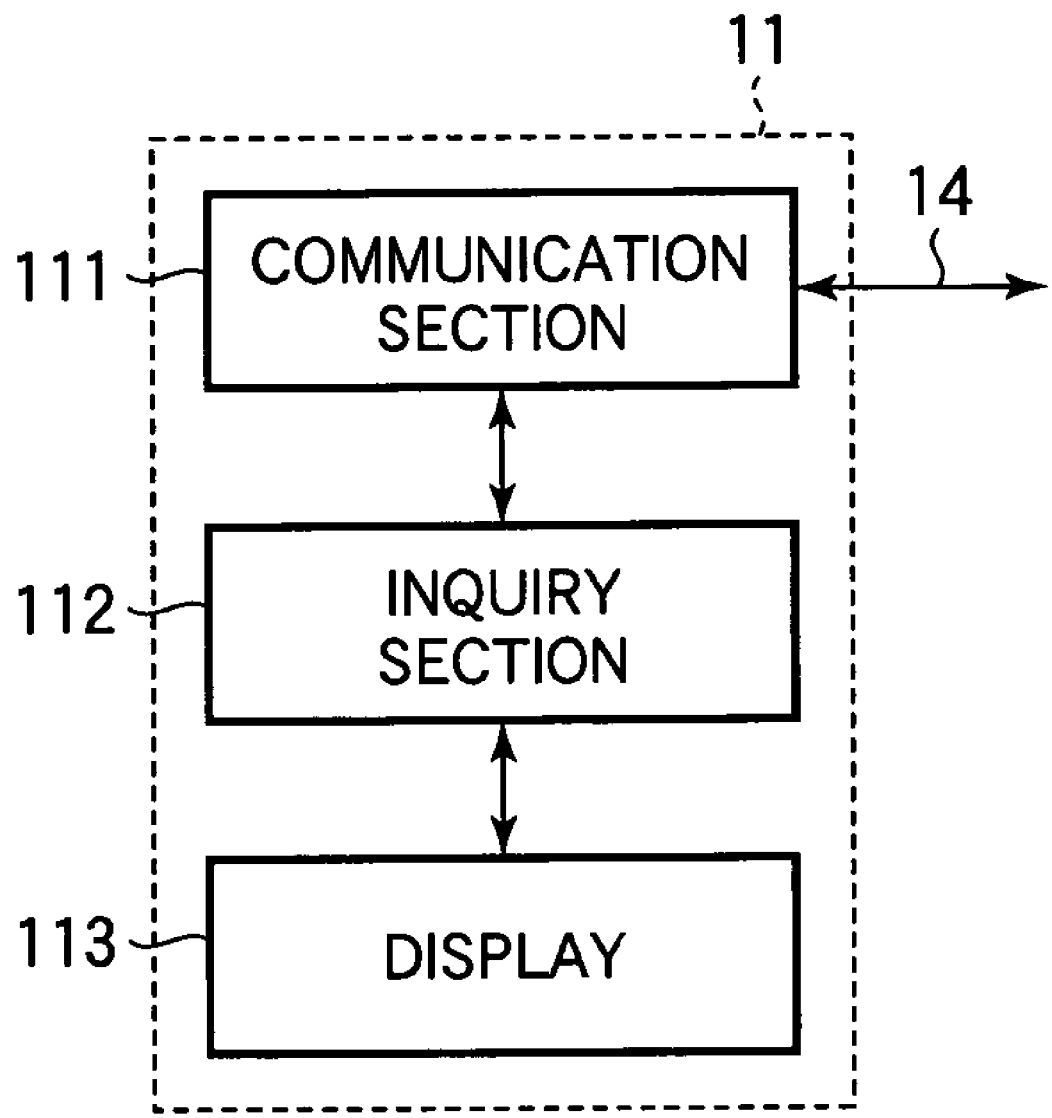
FIG. 4 is a block diagram of a personal computer.

FIG. 4 is a block diagram of a personal computer (PC) 11.

Referring to FIG. 4, a PC 11 is connected to the network 14. The PC 11 includes a communication section 111, an inquiry section 112, and a display 113. The communication section 111 communicates a variety of items of information between the printer 10. The inquiry section 112 sends an inquiry to the printer 10, requesting of the apparatus information. Then, the inquiry section 112 receives a reply from the printer 10 responding to the inquiry. The display 113 displays the apparatus information obtained through the inquiry section 112.

{Operation}

The operation of the image forming system of the aforementioned configuration will be described in terms of (1) operation for inputting the notification information, (2) operation for erasing the notification information, (3) operation for detecting the status of the printer 10, and (4) operation for sending an inquiry to request the status of the printer 10. The operation for detecting the status of the printer 10 is performed at regular intervals. Other operations are performed when, for example, the maintenance personnel operate the printer 10 or PC 11.

Figure 5:
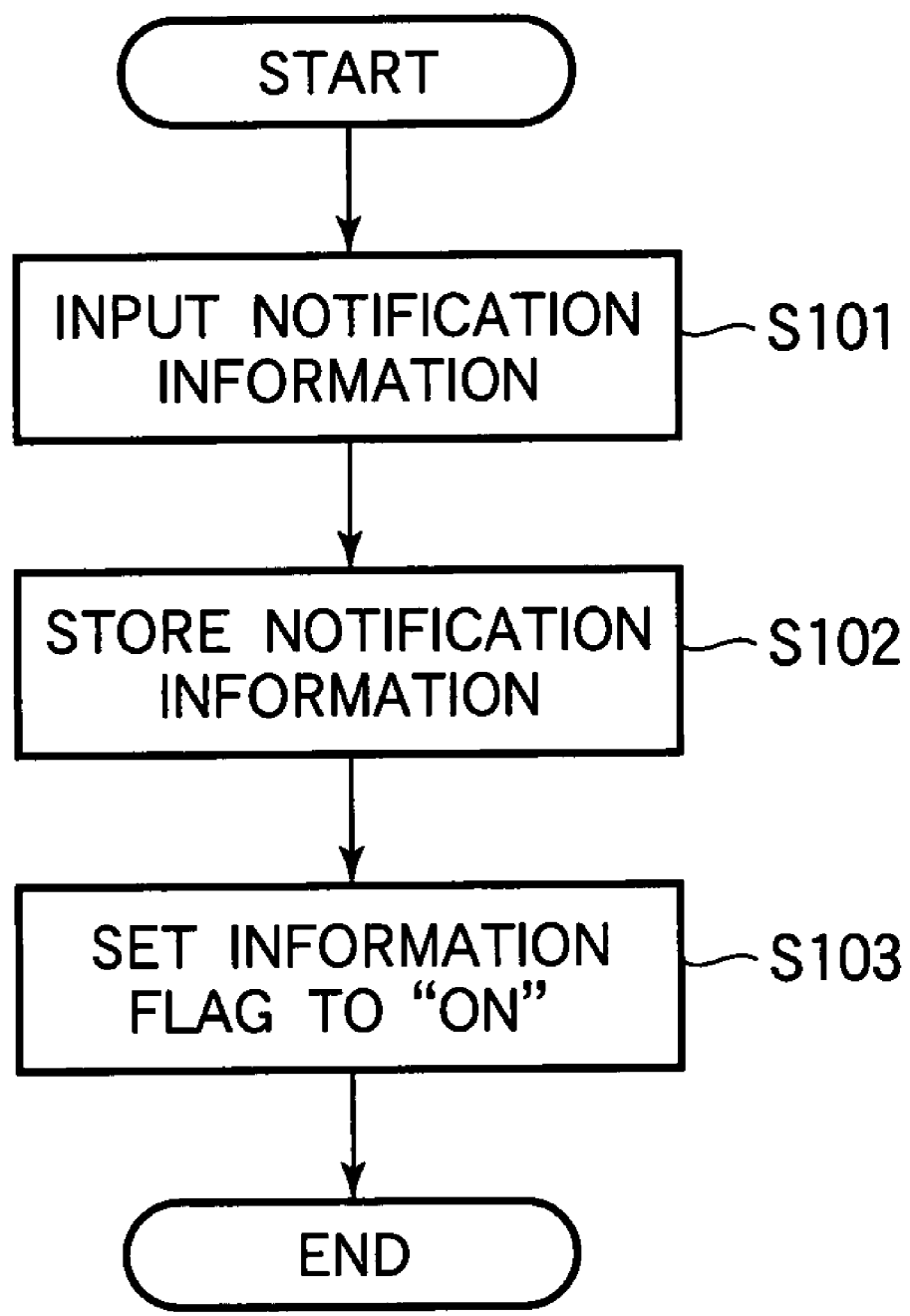
FIG. 5 is a flowchart illustrating the operation for inputting notification information.

FIG. 5 is a flowchart illustrating the operation for inputting the notification information. The operation for inputting the notification information will be described with reference to the flowchart in FIG. 5. When the notification information is inputted through the input section 101 (step S101), the notification information storage section 102 stores it (step S102). The notification information management section 103 sets the information flag to ON (step S103). This completes the operation for inputting the notification information.

Alternatively, the image forming system may be configured such that the PC 11 sends the notification information to the printer 10 through the network 14, the notification information storage section 102 stores the notification information, and the notification information management section 103 sets the information flag to ON. This alternative configuration enhances the convenience of the system since a user can notify the other users that he is going to print a large amount of information and the maintenance personnel is allowed to input the notification information at regular intervals without having to visit the areas at which the printer 10 is located.

Figure 6:
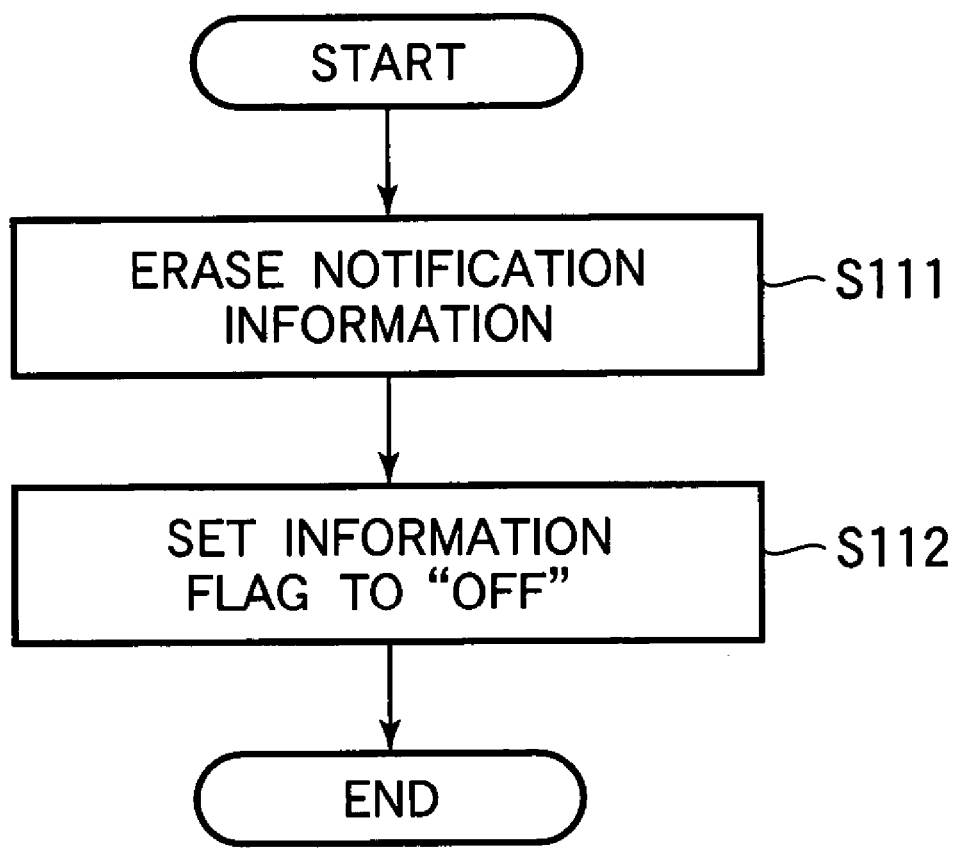
FIG. 6 is a flowchart illustrating the operation for erasing the notification information.

FIG. 6 is a flowchart illustrating the operation for erasing the notification information. The operation for erasing the notification information will be described with reference to the flowchart in FIG. 6. When the operator erases the notification information through the input section 101 (step S111), the notification information management section 103 resets the information flag to OFF (step S112). This completes the operation for erasing the notification information.

Figure 7:
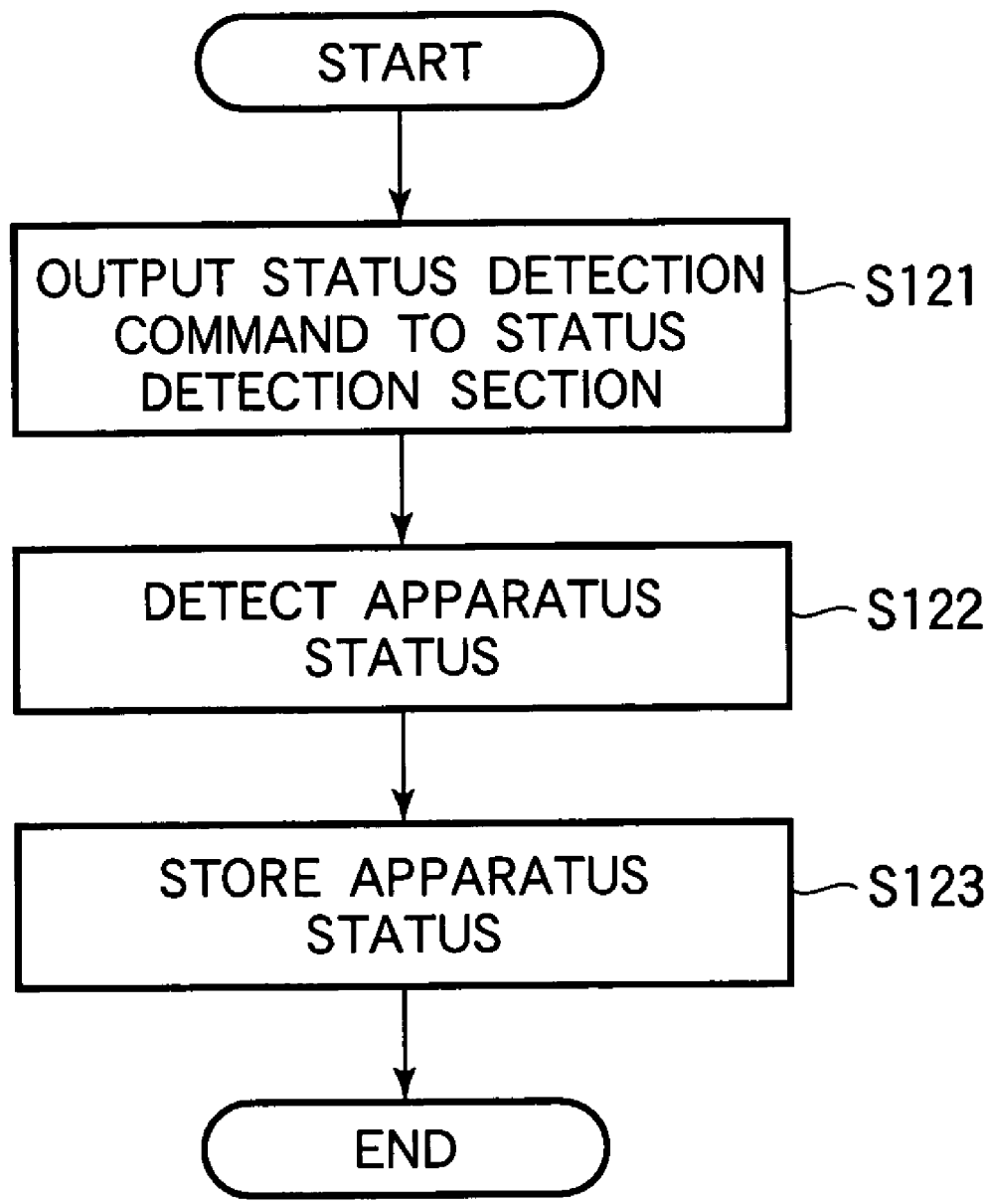
FIG. 7 is a flowchart illustrating the operation for detecting the status of the printer.

FIG. 7 is a flowchart illustrating the operation for detecting the status of the printer 10. The operation for detecting the status of the printer 10 will be described with reference to the flowchart in FIG. 7. The status detection controller 106 provides a status detection command to the status detection section 104 (step S121). In response to the status detection command, the status detection section 104 detects the current status of the printer 10 (step s122) The status storage section 105 stores the thus detected status information (step S123). This completes the operation for detecting the status of the printer 10.

Figure 8:
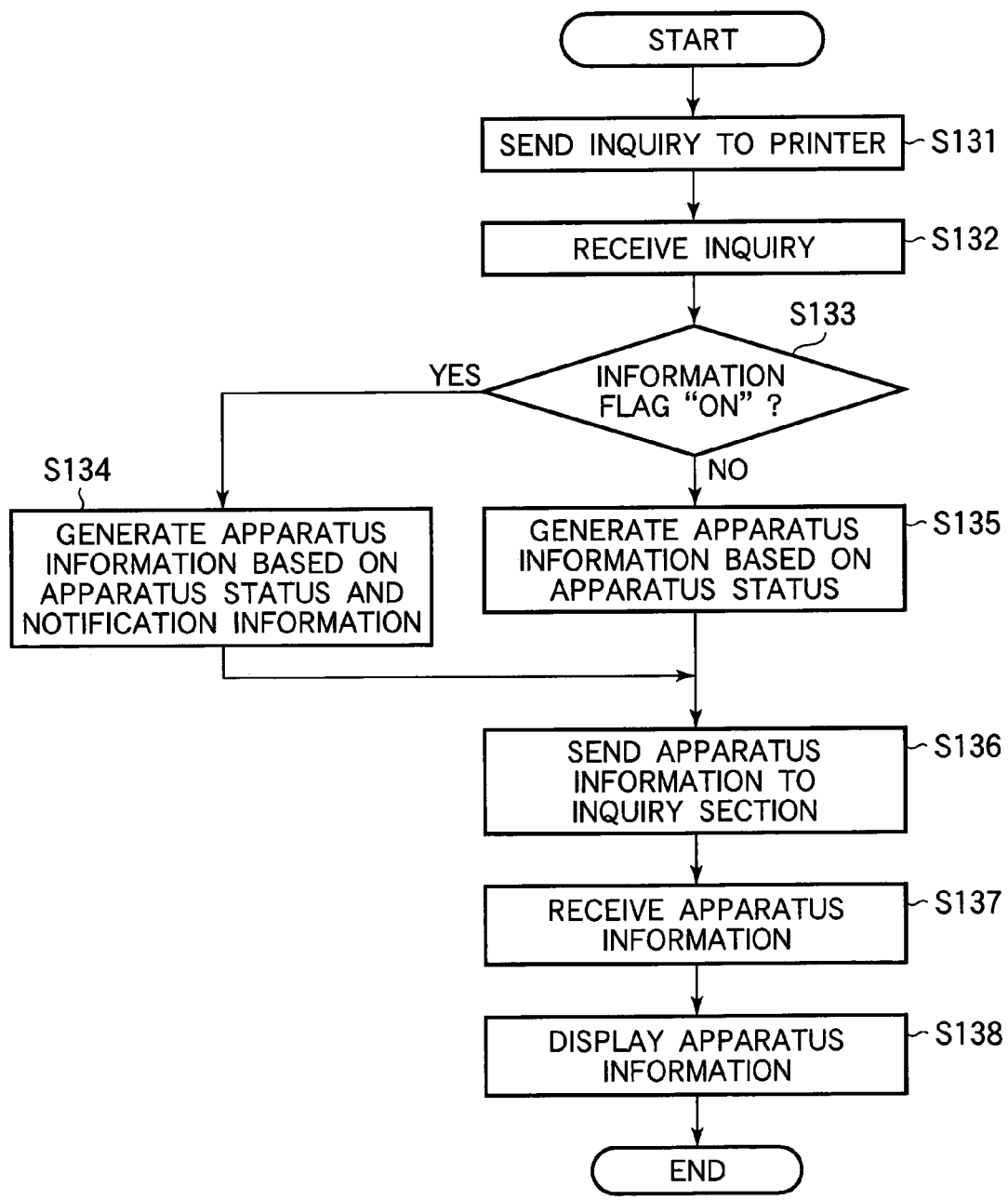
FIG. 8 is a flowchart illustrating the operation for receiving the apparatus information from the printer.

FIG. 8 is a flowchart illustrating the operation for receiving the apparatus information from the printer 10. The operation of the PC 11 for receiving the apparatus information from the printer 10 will be described with reference to FIG. 8. The inquiry section 112 sends an inquiry requesting of the apparatus information to the printer 10 (step S131). The inquiry is sent to the communication section 108 over the network 14 and the response controller 1073 receives the inquiry. Upon receiving the inquiry, the response controller 1073 requests the information generation section 1072 to generate the apparatus information (step S132).

Upon receiving the request from the response controller 1073, the information generation section 1072 requests the decision section 1071 of a determination as to what apparatus information should be generated. The decision section 1071 refers the information flag of the notification information management section 103 (step S133).

If the information flag has been ON, the decision section 1071 sends to the information generation section 1072 a decision that the apparatus information should be generated based on the notification information and the apparatus status. The information generation section 1072 in turn reads the apparatus status from the status storage section 105 and the notification information from the notification information storage section 102 to generate the apparatus information (step S134).

If the information flag has been OFF, the decision section 1071 sends to the information generation section 1072 a decision that the apparatus information should be generated based only on the apparatus status. The information generation section 1072 in turn reads the apparatus status from the status storage section 105 to generate the apparatus information (step S135).

The apparatus information is sent to the response controller 1073 which in turn sends the apparatus information in response to the inquiry outputted by the inquiry section 112 at step S131 (step S136). The inquiry section 112 receives the apparatus information (step S137) which in turn is displayed on the display 113 (step S138).

As described above, the notification information and the apparatus status are stored previously. Then, the apparatus information consisting of the apparatus status and the notification information is transmitted upon receiving the inquiry requesting of the apparatus information from the PC 11. Then, the apparatus information is displayed. Therefore, the users can obtain the notification information and the apparatus status at a time. This ensures that the users of the printer 10 receive the notification information that the users should be notified in advance. The first embodiment has been described with respect to a case in which when the printer receives an inquiry from the PC 11, the printer transmits the notification information to the PC 11. The configuration may be modified such that when the printer 10 receives print data from the PC 11, the printer 10 transmits the notification information to the PC 11. In this case, when the response controller 1073 receives the print data from the PC 11 via the communication section 108, the response controller 1073 obtains the apparatus information from the information generation section 1072 and sends it to the communication section 108.

Second Embodiment

{Construction}

In the first embodiment, the notification information is sent to the user even if the user wants to know only the apparatus status. Thus, if the user inquires the apparatus status many times in a short time, the same notification information is sent to the user every time the user inquires. A second embodiment prevents such duplication of transmission of the notification information.

Figure 9:
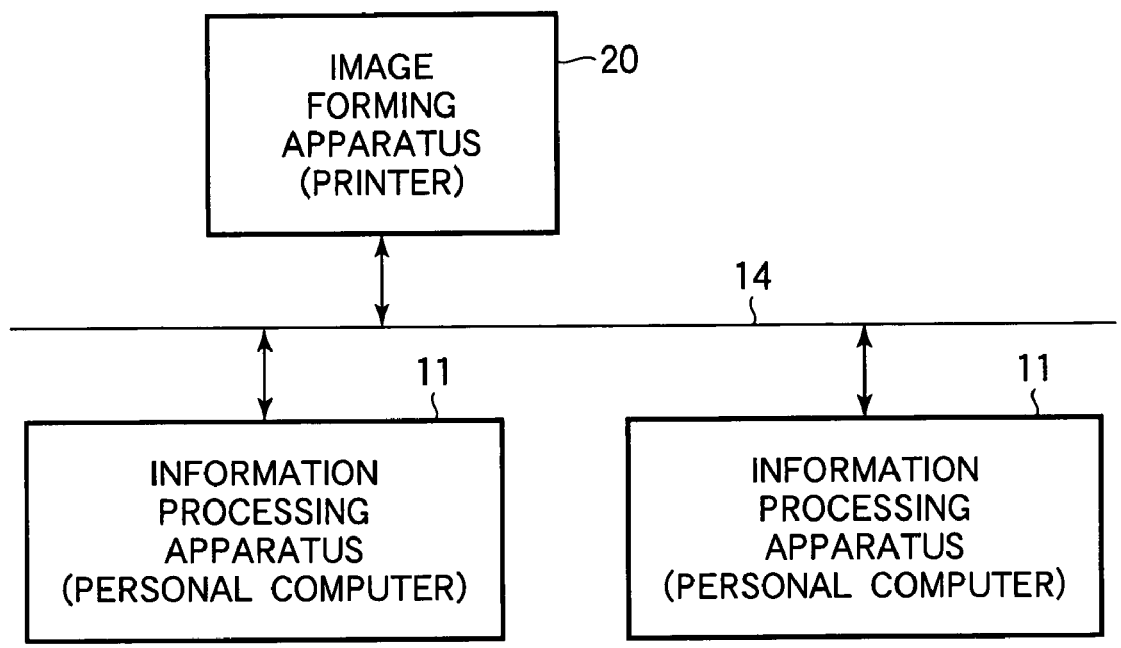
FIG. 9 illustrates an image-forming system according to a second embodiment.
Figure 10:
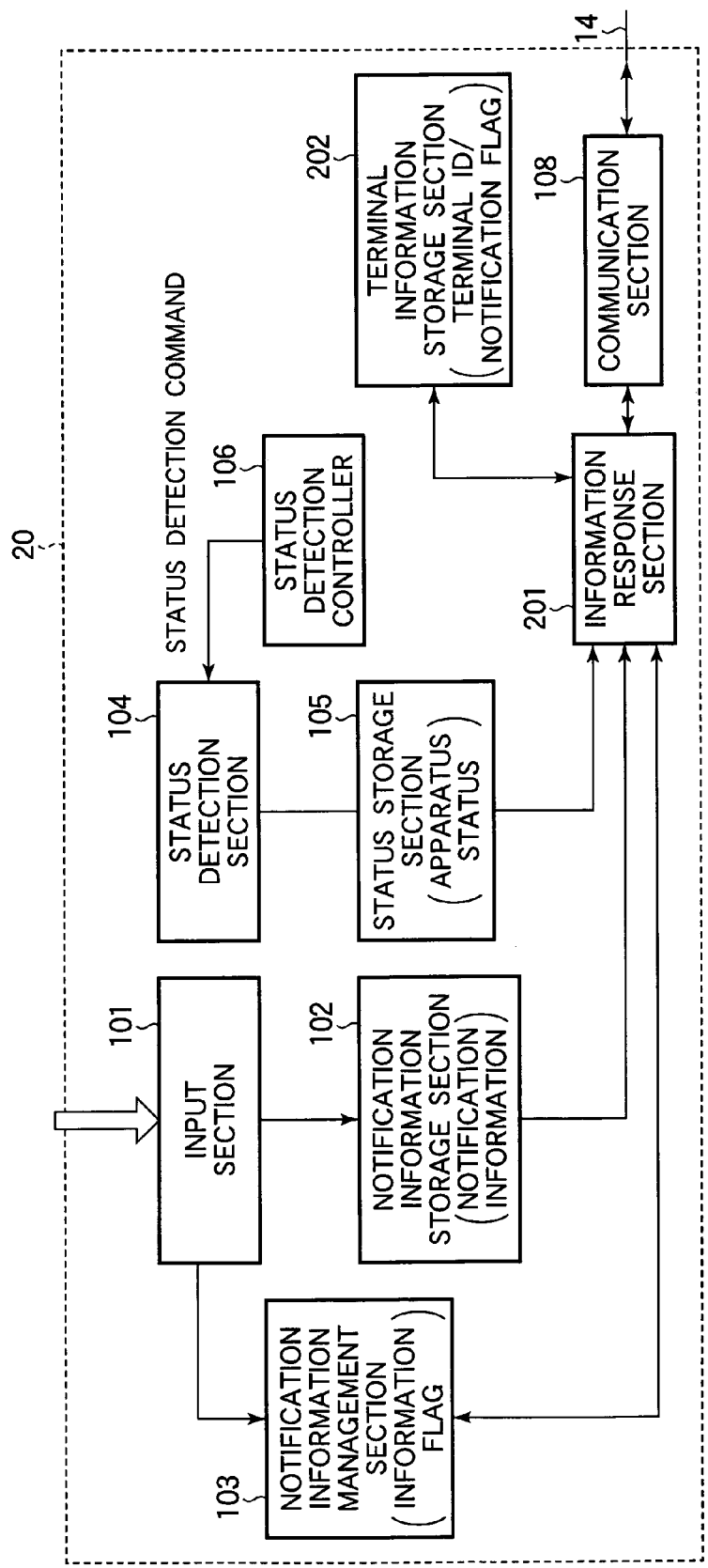
FIG. 10 is a block diagram of a printer.
Figure 11:
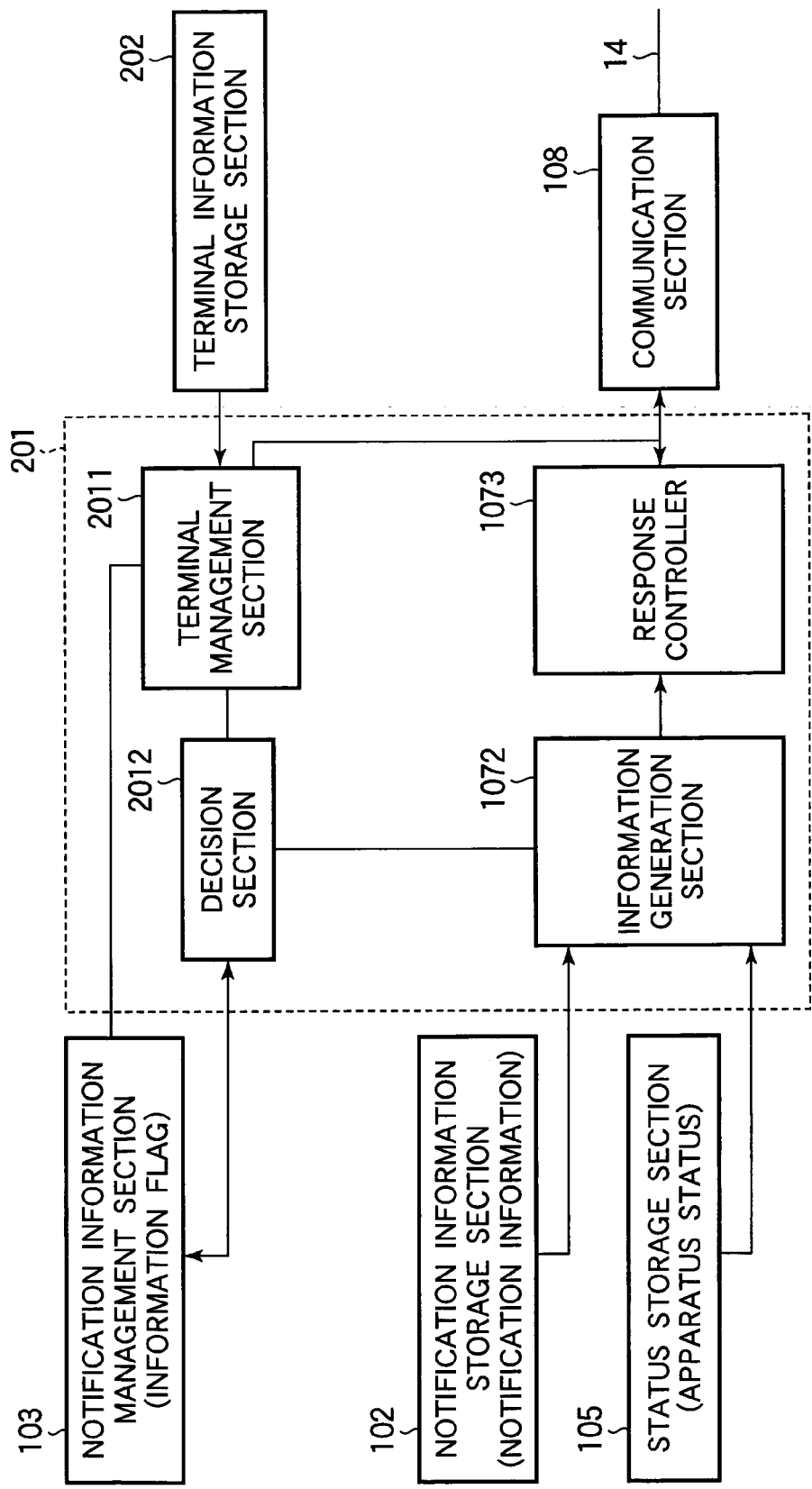
FIG. 11 is a block diagram of an information response section in the printer.

FIG. 9 illustrates an image-forming system according to the second embodiment. FIG. 10 is a block diagram of a printer 20. FIG. 11 is a block diagram of an information response section 201 in the printer 20. The second embodiment has the same basic configuration as the first embodiment. The second embodiment differs from the first embodiment in that the printer 20 has a terminal information storage section 202 and the information response section 201 has a terminal management section 2011.

The terminal information storage section 202 stores a terminal identification (referred to as terminal ID hereinafter) of a PC 11 that sent an inquiry requesting of the apparatus information to the printer. The terminal information storage section 202 also stores notification flags for individual terminal IDs. The terminal ID and notification flag of the PC 11 are described as "terminal information" hereinafter.

The notification flag indicates whether the notification information has been notified to the PC 11. The notification flag is set to ON if the notification information has been notified, and reset to OFF if the notification information has not been notified. The setting of the notification flag is done in the terminal management section 2011. When the information flag is reset, the notification flag is also reset. In other words, when the notification information does not exist, the notification information does not exist either and thus the notification flag is reset.

A decision section 2012 refers to the information flag and the notification flag to determine what apparatus information should be produced.

In other words, when the information flag and the notification flag are ON, the notification information has been notified to the PC 11 at the terminal ID. Therefore, the decision section 2012 determines that the apparatus information is actually the apparatus status.

When the information flag is ON but the notification flag is OFF, the decision section 2012 determines that the apparatus information should include both the notification information and the apparatus status.

When the information flag is OFF, there is no notification information and the decision section 2012 determines that the apparatus information should be the apparatus status regardless of whether the notification flag is ON or OFF.

Thus, once the PC 11 receives an item of notification information, then the PC 11 will not receive the same item of notification information. This prevents the same user from receiving the same notification information many times.

{Operation}

The operation of the aforementioned configuration includes (1) operation for inputting the notification information, (2) operation for erasing the notification information, (3) operation for detecting the status of the printer 10, and (4) operation for sending an inquiry to request the status of the printer 10. The operations (1), (2), and (4) will be described. The operation (3) is the same as the first embodiment and the description is omitted.

Figure 12:
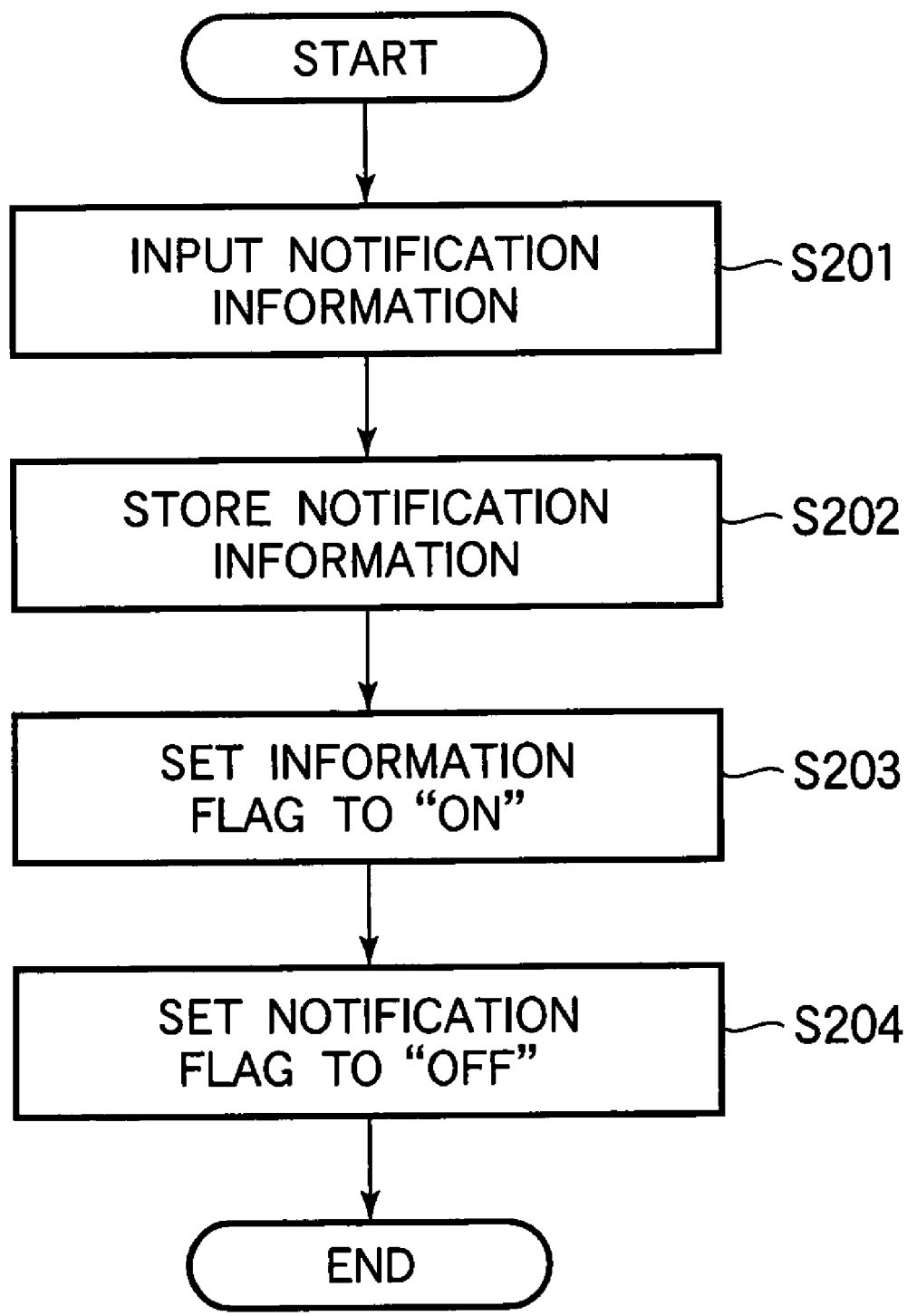
FIG. 12 is a flowchart illustrating the operation for inputting notification information.

FIG. 12 is a flowchart illustrating the operation for inputting notification information. The operation for inputting the notification information will be described with reference to the flowchart in FIG. 12. When the notification information is inputted through the input section 101 (step S201), the notification information storage section 102 stores the notification information (step S202). The notification information management section 103 sets the information flag (step S203). The terminal management section 2011 resets all of the notification flags (step S204). In other words, because new notification information has been inputted, all of the notification flags are reset. This completes the operation for inputting the notification information.

Figure 13:
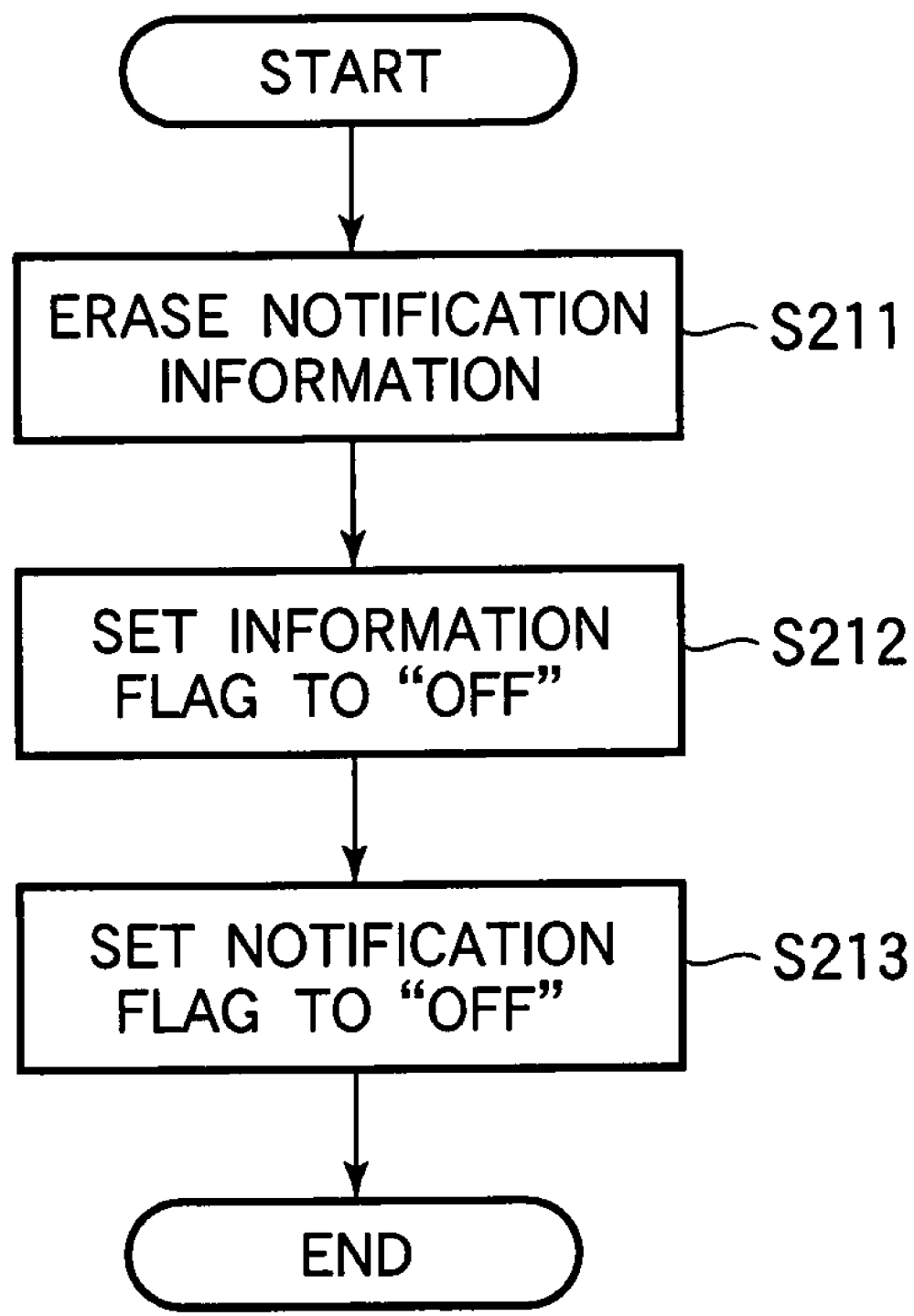
FIG. 13 is a flowchart illustrating the operation for erasing the notification information.

FIG. 13 is a flowchart illustrating the operation for erasing the notification information. The operation for erasing the notification information will be described with reference to the flowchart in FIG. 13. When the notification information is erased through the input section 101 (step S211), the notification information management section 103 resets the information flag (step S212) and the terminal management section 2011 resets all of the notification flags to OFF (step S213). In other words, because new notification information has been inputted, all of the notification flags are reset. This completes the operation for erasing the notification information.

Figure 14:
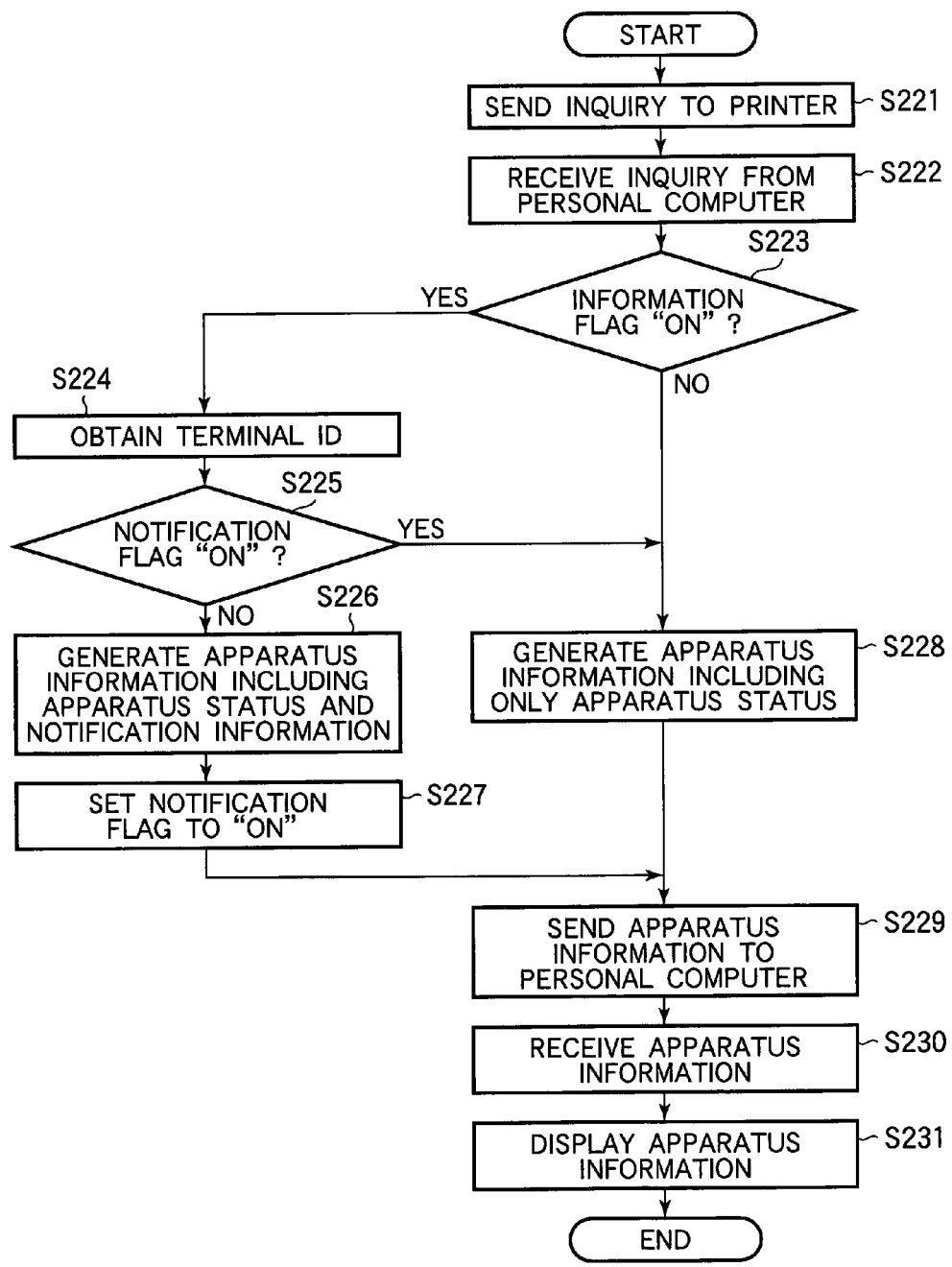
FIG. 14 is a flowchart illustrating the operation for sending an inquiry to request the status of the printer.

FIG. 14 is a flowchart illustrating the operation for sending an inquiry to request the status of the printer. The operation for sending an inquiry to request the status of the printer for a PC 11 will be described with reference to the flowchart in FIG. 14. The inquiry section 112 sends an inquiry to the printer 10, requesting the apparatus information (step S221).

The inquiry is sent to the response controller 1073 through the communication section 111, network 14, and communication section 108. Upon receiving the inquiry, the response controller 1073 requests the information generation section 1072 to generate the apparatus information (step S222).

The information generation section 1072 requests the decision section 2012 to decide what the apparatus information should be generated. The decision section 2012 makes a decision as to whether the information flag is ON (step S223). If the information flag is OFF, then the information generation section 1072 generates the apparatus information that includes only apparatus status (step S228).

If the information flag is ON, the terminal management section 2011 obtains a terminal ID from the communication section 108 and makes a decision as to whether the notification flag for this ID is ON (steps S224 and S225). If the notification flag is ON, the information generation section 1072 generates the apparatus information including only the apparatus status (step S228). If the notification flag is OFF, the information generation section 1072 generates the apparatus information including the apparatus status and notification information (steps S226 and S227).

The response controller 1073 sends the thus generated apparatus information to the PC 11 that inquired the status of the printer. The inquiry section 112 receives the apparatus information and displays it on the display 113 (steps S229-S231).

The notification flag has been described in terms of binary states i.e., set (ON) or reset (OFF). The user may not be disturbed too much if the same notification information is received, for example, up to three times. The image forming system may be configured in such a way that the notification flag contains a plurality of bits that indicate the number of times that the same notification information is sent. Thus, the same notification information is sent as many times as the predetermined number of times. In this manner, even if the notification information is not useful to the user when the user receives the notification information for the first time, the same notification is useful to the user when the user receives it for the second time or third time. This is of great utility.

If the number of times that the notification information should be sent can be selectively set, notification information of more importance may be sent a larger number of times than information of less importance. The number of times that the notification information should be sent is basically specified through the input section 101 but may be specified by the user through the PC 11.

Of course, the image forming system may be configured to select either a mode in which the number of times can be set or a mode in which the number of times cannot be set. For a PC 11 that does not use the printer very often, the image forming system may be configured so that the terminal information storage section 202 does not manage the terminal ID for that PC 11. Such a configuration is effective in saving storage areas in the terminal information storage section 202.

As described above, the notification information and the apparatus status are stored previously. Then, the apparatus information consisting of the apparatus status and notification information is transmitted upon receiving the inquiry requesting of the apparatus information from the PC 11. Then, the apparatus information is displayed. Therefore, the users can obtain the notification information and the apparatus status at a time. This ensures that the users of the printer 10 receive the notification information that the users should be notified.

Because the notification flag is managed, the same notification information is not sent as many times as such notification is a nuisance to the user.

Third Embodiment

{Construction}

If the user receives notification information on a scheduled event too early, then the user may forget it toward the date on which the scheduled event takes place. A third embodiment has the feature that the date and time of initiation of notification, i.e., the date and time at which the notification information should be sent can be set.

Figure 15:
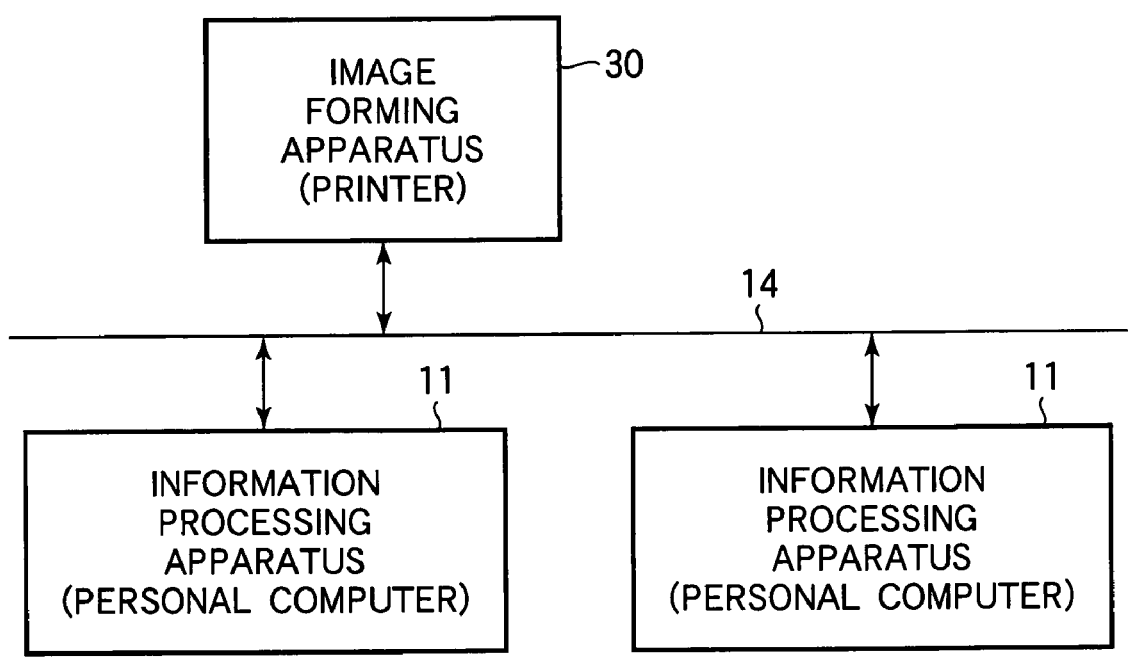
FIG. 15 illustrates the general configuration of an image forming system according to a third embodiment.
Figure 16:
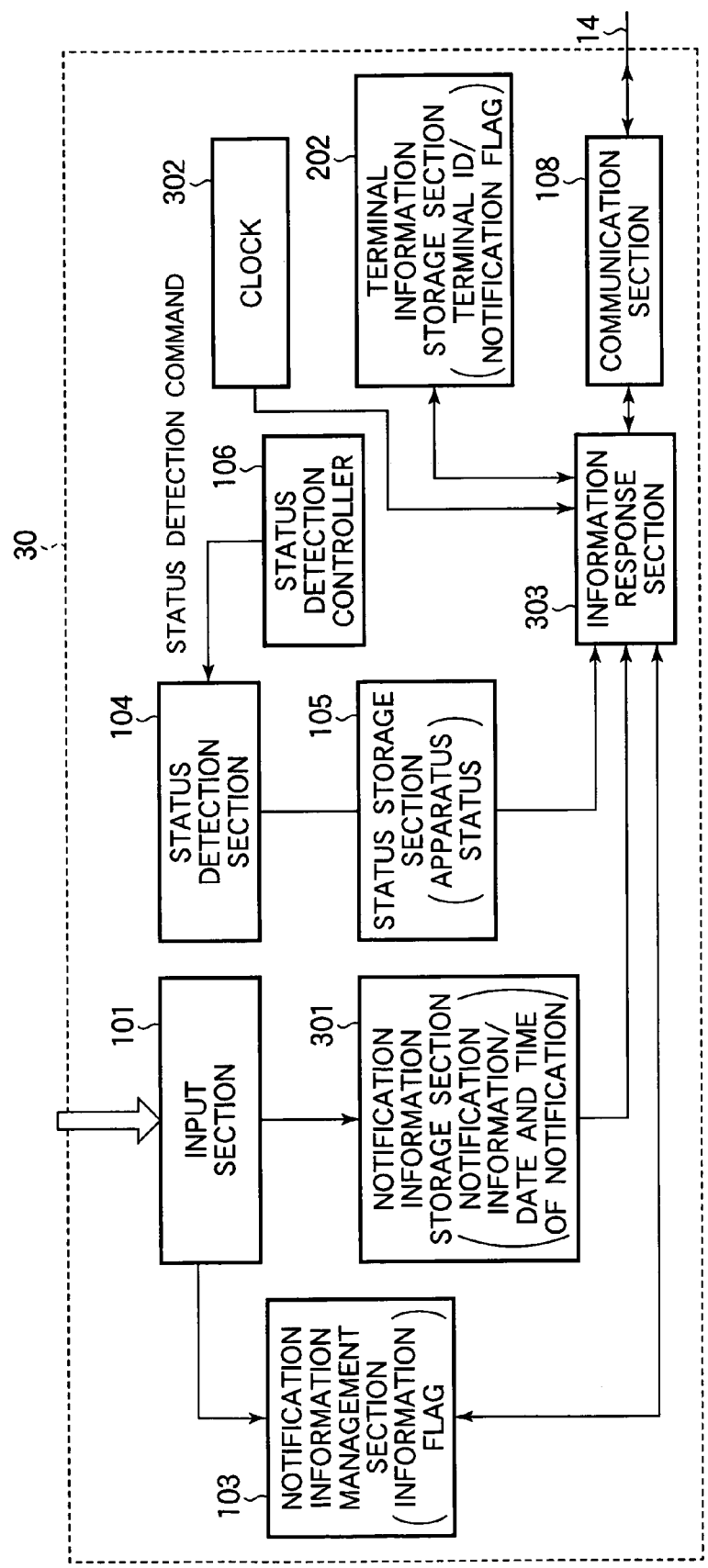
FIG. 16 is a block diagram of a printer.
Figure 17:
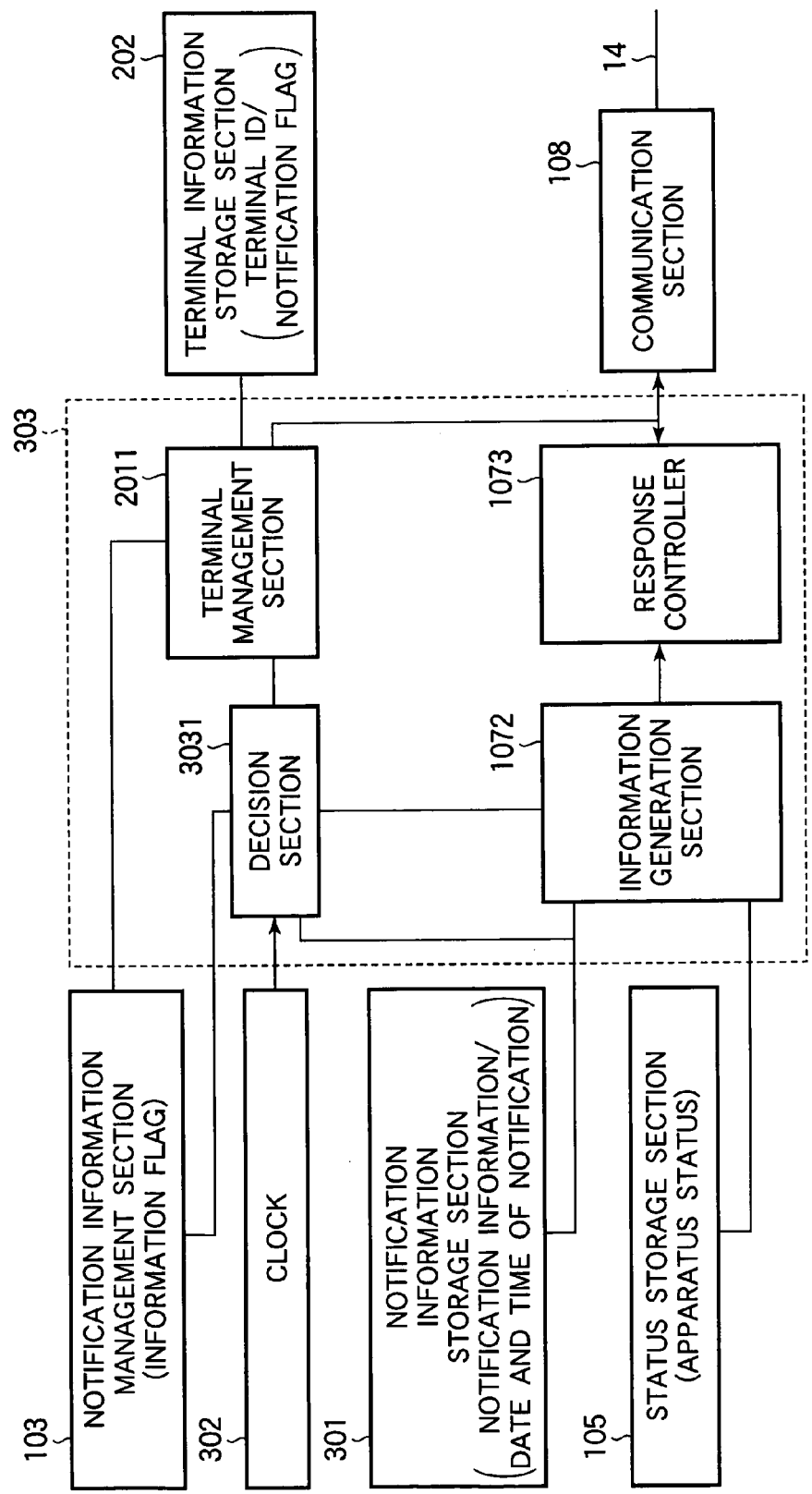
FIG. 17 is a block diagram of an information response section in the printer.

FIG. 15 illustrates the general configuration of an image forming system according to the third embodiment. FIG. 16 is a block diagram of a printer 30. FIG. 17 is a block diagram of an information response section 303 in the printer 30. The third embodiment has the same basic configuration as the second embodiment except that the printer 30 has a clock 302 and a notification information storage section 301 and an information response section 303 are used in place of the notification information storage section 102 and the information response section 201.

The notification information storage section 301 stores the notification information inputted through an input section 101 and date and time at which the notification information is to be sent. The clock 302 generates time data that describes current date and time.

A decision section 3031 of the information response section 303 makes a decision as to whether the current date and time generated by the clock 302 have reached the date and time of initiation of notification, i.e., the date and time at which the notification information should be sent. If the current date and time have reached the date and time of initiation of notification, the decision section 3031 refers the information flag and the notification flag to determine what apparatus information should be generated.

If the current date and time have not reached the date and time of initiation of notification, then the notification information is not sent even though the notification information exists before the time at which the notification information should be sent. In other words, the ON states of the information flag and notification flag imply that a PC 11 having a corresponding terminal ID has received the notification information. Therefore, the apparatus information includes the apparatus status only. The OFF state of the notification flag implies that a PC 11 having a corresponding terminal ID has not received the notification information. Therefore, the apparatus information includes the notification information and the apparatus status.

The OFF state of the information flag implies that there is no notification information to be sent and therefore the apparatus information includes only the apparatus status regardless of the state of the notification flag. This configuration prevents a PC 11 from receiving the same notification information if the PC 11 has received the same notification information once.

When the current date and time have not reached the date and time of initiation of notification, if the information flag is ON and the notification flag is OFF, then the apparatus information includes only the apparatus status.

{Operation}

The operation of the aforementioned configuration includes (1) operation for inputting the notification information, (2) operation for erasing the notification information, (3) operation for detecting the status of the printer 10, and (4) operation for sending an inquiry to request the status of the printer 10. The operations (1) and (3) will be described. The operations (2) and (4) are the same as the first embodiment and the description is omitted.

Figure 18:
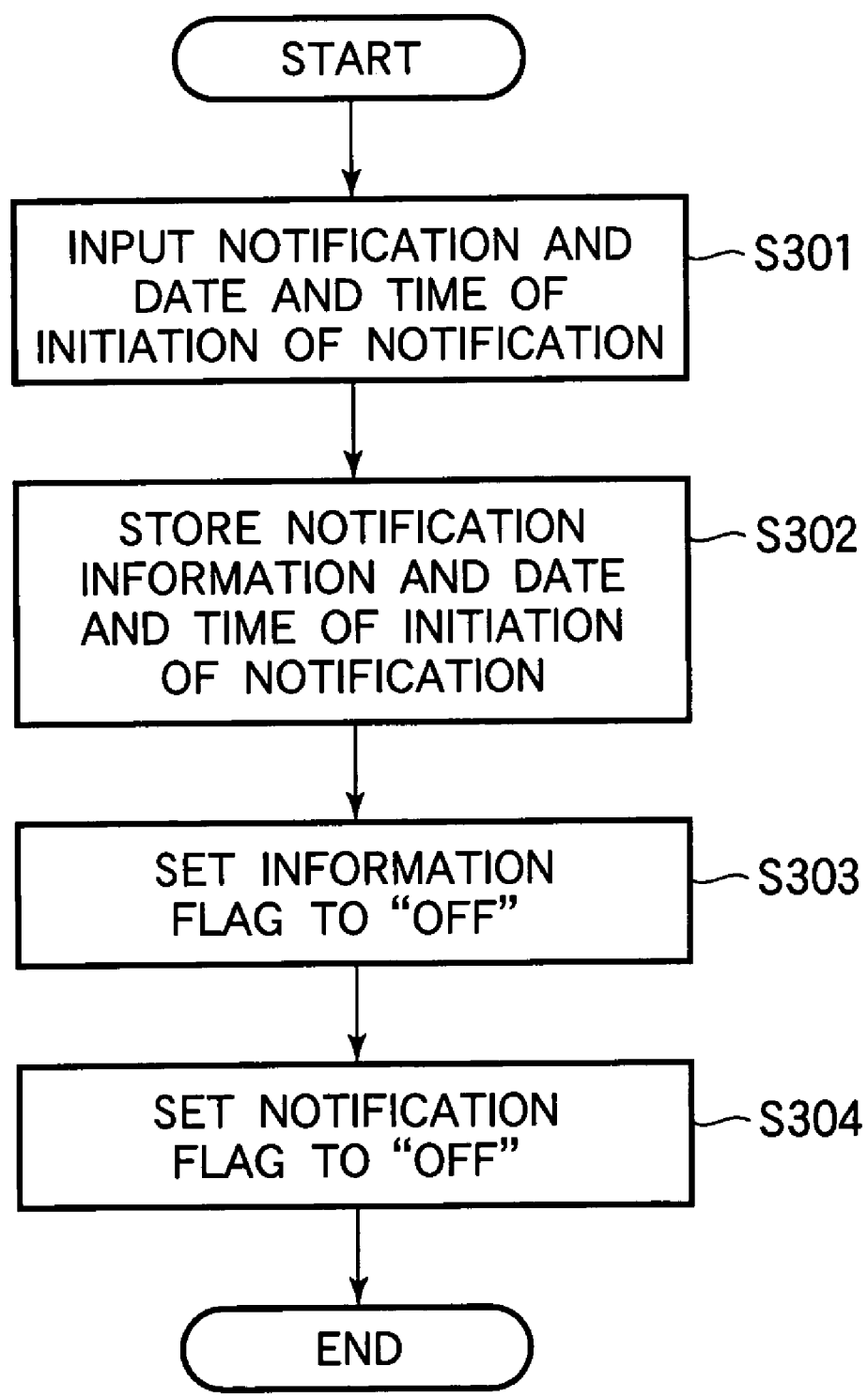
FIG. 18 is a flowchart illustrating the operation for inputting notification information.

FIG. 18 is a flowchart illustrating the operation for inputting notification information. The operation for inputting notification information will be described with reference to the flowchart in FIG. 18. When the notification information and the date and time of initiation of notification are inputted through the input section 101 (step S301), the notification information storage section 102 stores the notification information and the date and time of initiation of notification (step S302). The notification information management section 103 sets the information flag to ON (step S303). The terminal management section 2011 resets all of the notification flags to OFF (step S304). This completes the operation for inputting the notification information.

Figure 19:
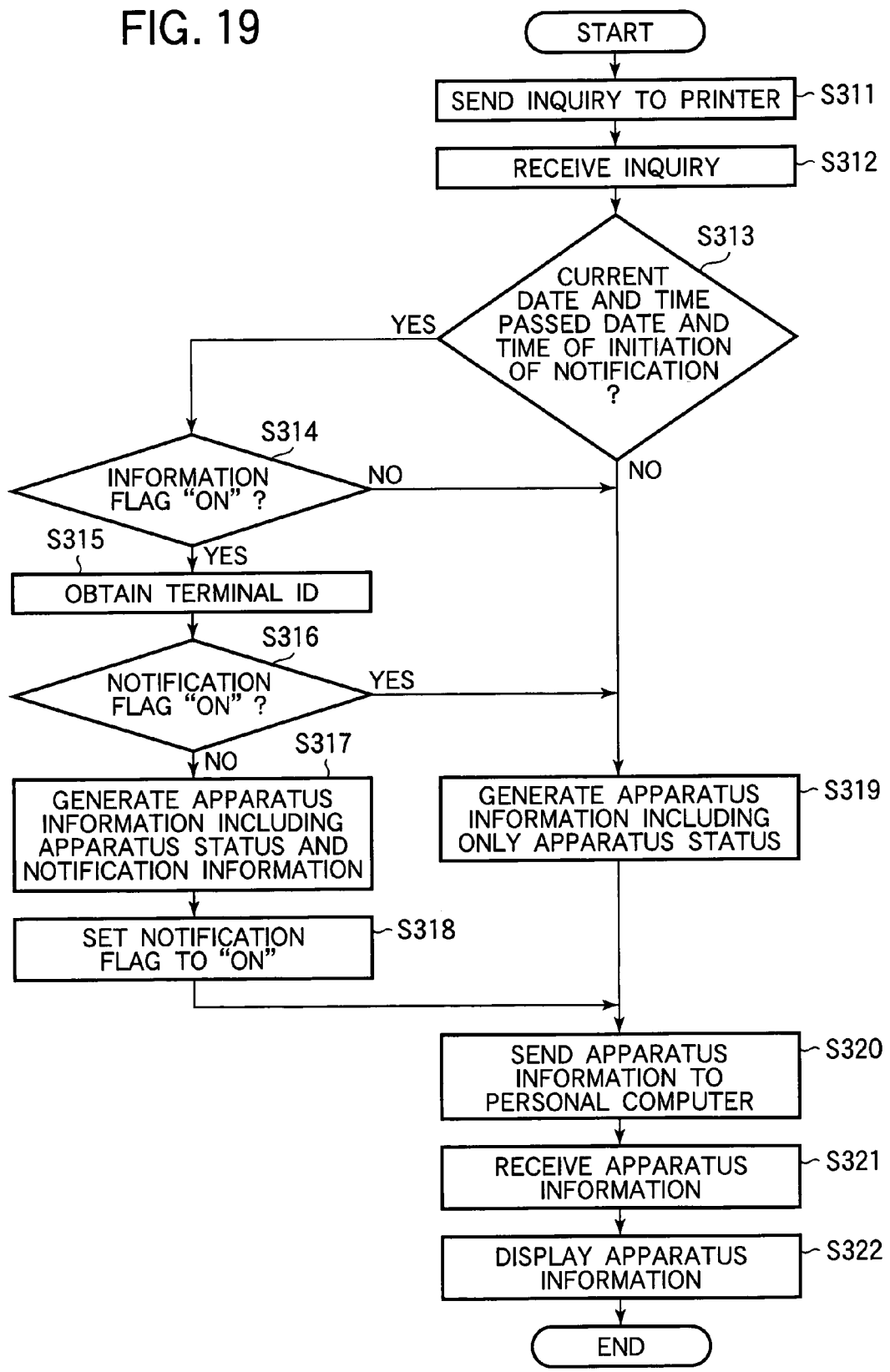
FIG. 19 is a flowchart illustrating the operation for sending an inquiry to request the status of the printer.

FIG. 19 is a flowchart illustrating the operation for sending an inquiry to request the status of the printer. The operation for sending an inquiry to request the status of the printer for a PC 11 will be described with reference to the flowchart in FIG. 19. The inquiry section 112 of the PC 11 sends an inquiry requesting of the apparatus information to the printer 30 (step S321). The inquiry is sent to the response controller 1073 through the communication section 111, network 14, and communication section 108. Upon receiving the inquiry, the response controller 1073 requests the information generation section 1072 to generate the apparatus information (step S312).

The decision section 3031 refers the date and time of initiation of notification (stored in the notification information storage section 301) and the current date and time generated by the clock 302, thereby determining whether the current date and time have passed the date and time of initiation of notification (step S313).

If the current date and time have not reached the date and time of initiation of notification, then the information generation section 1072 generates the apparatus information including only apparatus status (step S319).

On the other hand, if the current date and time have passed the date and time of initiation of notification, then the information generation section 1072 requests the decision section 3031 of a decision as to what the apparatus information should be generated. The decision section 3031 refers to the information flag to determine whether the information flag is ON (step S314).

If the information flag is OFF, then the information generation section 1072 generates the apparatus information including only the apparatus status (step S319). Alternatively, if the information flag is ON, then the terminal management section 2011 obtains a terminal ID of a corresponding PC 11 through the communication section 108, thereby determining whether the notification flag for the terminal ID is ON (step S316). If the notification flag is ON, then the information generation section 1072 generates the apparatus information including only the apparatus status (step S319). If the notification flag is OFF, the information generation section 1072 generates the apparatus information containing the apparatus status and notification information and then sets the notification flag to ON (steps S317 and S318).

Then, the response controller 1073 sends the thus generated apparatus information to the PC 11 that inquired the status of the printer (step S320). The inquiry section 112 of the PC 11 receives the apparatus information and displays it on the display 113 (step S322).

As described above, the notification information and the apparatus status are stored previously. Then, the apparatus information consisting of the apparatus status and notification information is transmitted upon receiving the inquiry requesting of the apparatus information from the PC 11. Then, the apparatus information is displayed. Therefore, the users can obtain the notification information and the apparatus status at a time. This ensures that the users of the printer 10 receive the notification information that the users should be notified.

Because the notification flag is managed, the same notification information is not sent to the user many times so that the user is freed from the nuisance of receiving the same information repeatedly.

In the third embodiment, the date and time of initiation of notification are set, i.e., the date and time at which the notification information is to be sent are set. When the current date and time have passed the date and time of initiation of notification, the notification information is sent to the PC 11. This prevents the notification information from being sent to the PC 11 too earlier than a notified event takes place actually.

The notification information and the date and time of initiation of notification are inputted into the printer in advance. Therefore, the maintenance personnel are freed from actually inputting the notification information on the date on which the notification information should be sent to the user.

Fourth Embodiment

{Construction}

Some notification information is sent to the users at regular intervals such as every day, tenth day of every month, or every Monday, and therefore a printer is busy on such dates and times. Such information is not worthwhile to retain after the specific date and time. Thus, the maintenance personnel erase such information after the specific date and time. The information is periodical and needs to be erased periodically accordingly. This is a burden on the maintenance personnel. A fourth embodiment allows automatic deletion of the notification information after such information has been sent at the specific date and time.

Figure 20:
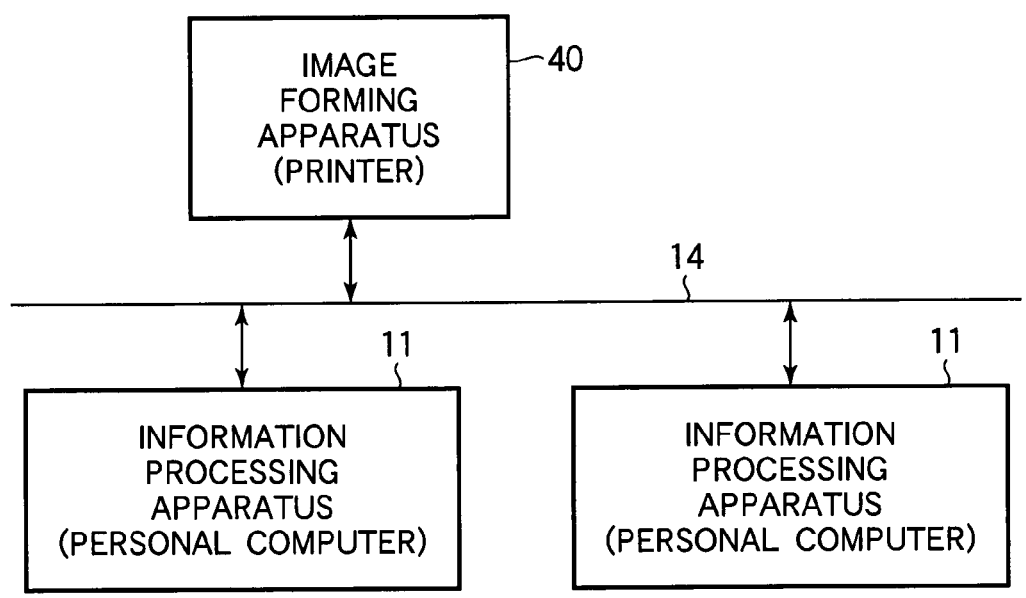
FIG. 20 illustrates an image-forming system according to a fourth embodiment.
Figure 21:
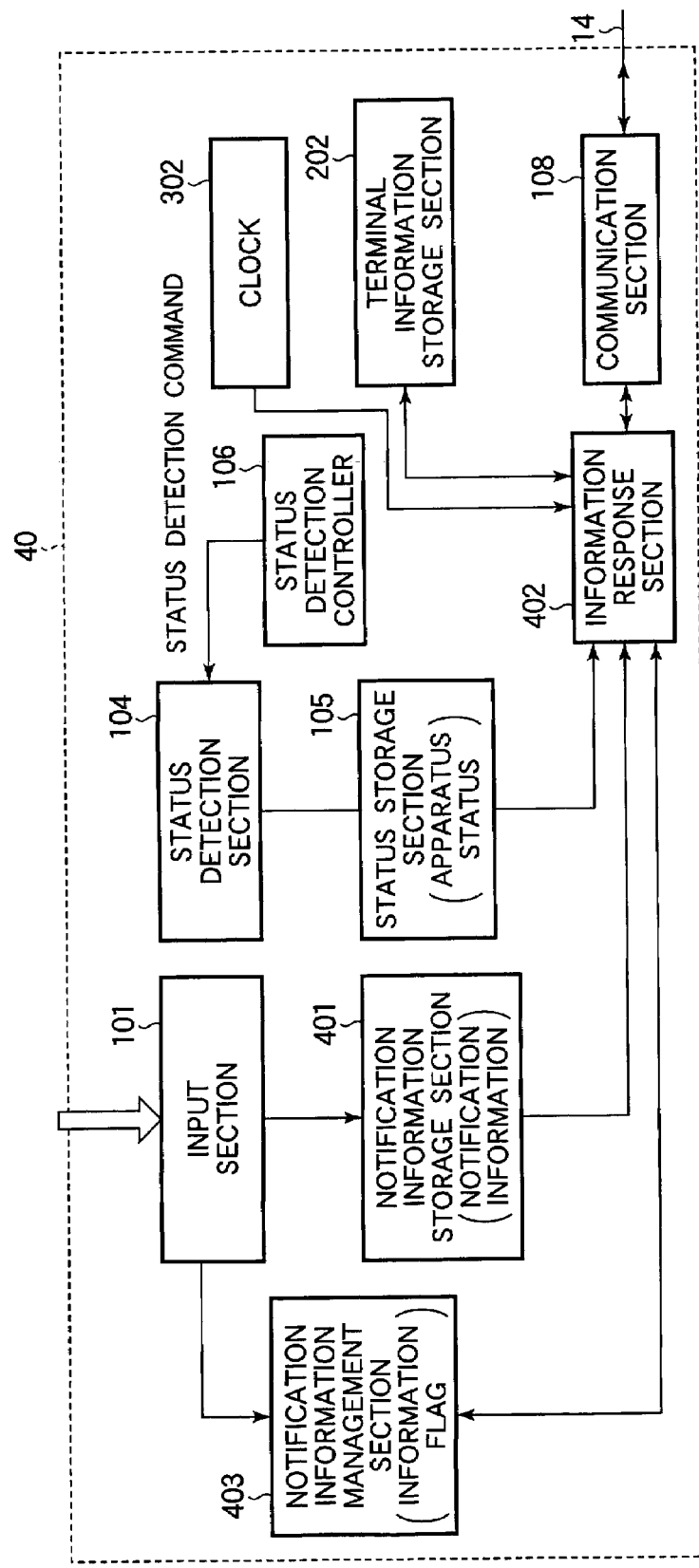
FIG. 21 is a block diagram of a printer according to the fourth embodiment.
Figure 22:
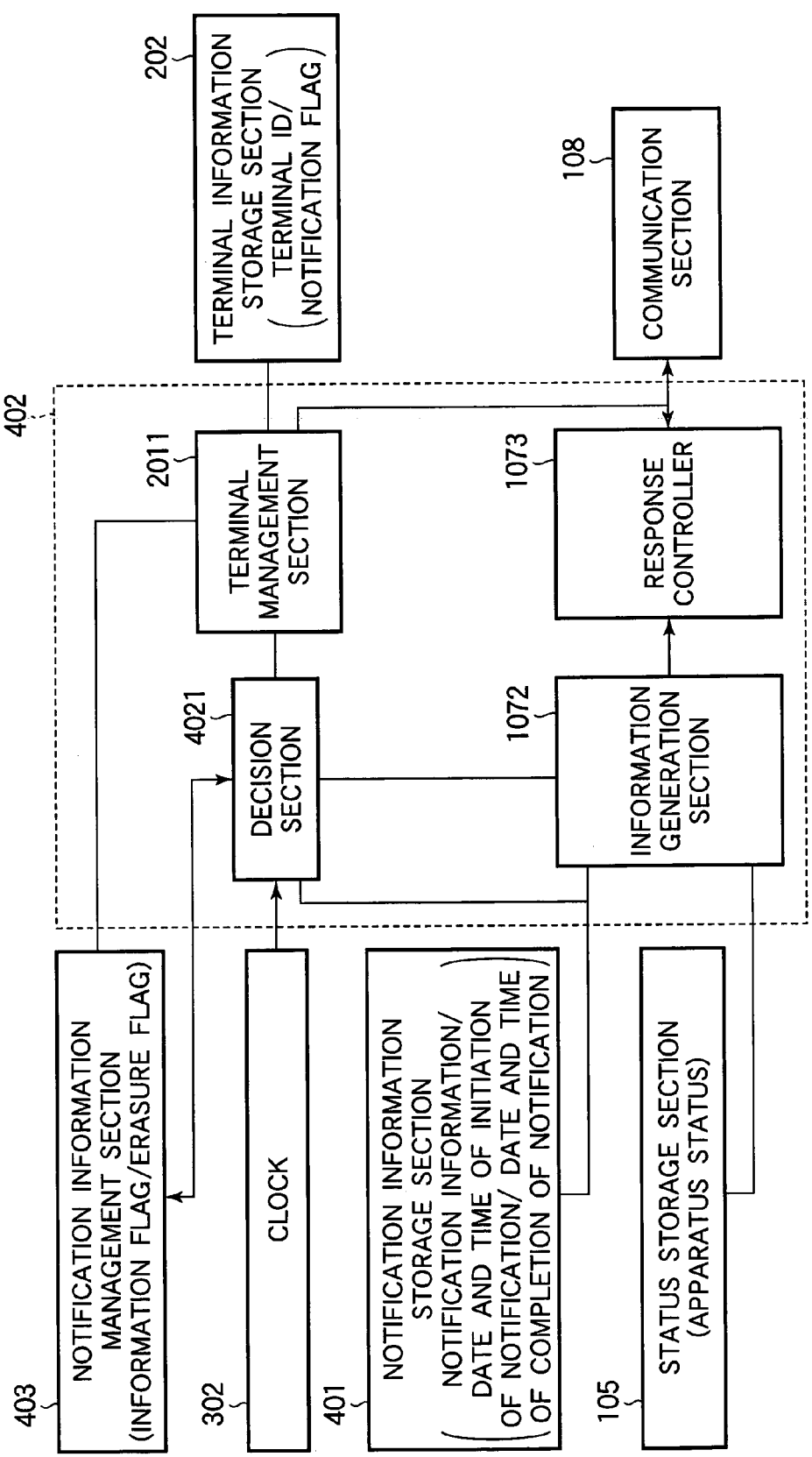
FIG. 22 is a block diagram of an image response section of the printer.

FIG. 20 illustrates an image-forming system according to the fourth embodiment. FIG. 21 is a block diagram of a printer 40 according to the fourth embodiment. FIG. 22 is a block diagram of an image response section 303 of the printer 40. The fourth embodiment has the same basic configuration as the third embodiment except that a notification information management section 403, a notification information storage section 401, and an information response section 402 are used in place of the notification information management section 103, a notification information storage section 301, and an information response section 303. In addition, a decision section 4021 is used in place of the decision section 3031.

The notification information storage section 401 stores the notification information, the date and time of initiation of notification, and the date and time of completion of notification, i.e., the date and time at which the transmission of the notification information should have been completed. The notification information management section 403 manages the information flag and the erasure flag. When the erasure flag are ON, the information flag is reset to OFF after the current date and time pass the date and time of completion of notification. When the information flag becomes OFF, the apparatus information contains only the apparatus status and therefore the image forming system is prevented from sending a useless notification, i.e., information on the busy hours of the printer 40 is sent after the busy hours have passed. In addition, the configuration frees the maintenance personnel from the burden of deleting the information that has been sent out.

The decision section 4021 of the information response section 402 makes a decision whether the current date and time generated by the clock 302 are before or after the date and time of initiation of notification or the date and time of completion of notification. If the current time is after the date and time of initiation of notification and before the date and time of completion of notification, the decision section 4021 refers to the information flag and the notification flag, thereby determining what apparatus information should be generated. For this reason, when the current date and time have not reached the date and time of initiation of notification, the apparatus information does not include the notification information even though the notification information exists.

In other words, when the information flag and the notification flag are set to ON after the current date and time pass the date and time of initiation of notification but before the date and time of completion of notification, the apparatus information includes only the apparatus status. This is because the notification information has been sent to the PC 11 of a corresponding terminal ID.

When the information flag is ON but the notification flag is OFF after the current date and time pass the date and time of initiation of notification but are before the date and time of completion of notification, the apparatus information includes both the notification information and the apparatus status.

When the information flag is OFF, there is no notification information to be sent. Therefore, the apparatus information includes only the apparatus status regardless of whether the notification flag is ON or OFF.

{Operation}

The operation of the image forming system of the aforementioned configuration will be described in terms of the following operations: (1) operation for inputting the notification information, (2) operation for erasing the notification information, (3) operation for detecting the status of the printer 40, and (4) operation for sending an inquiry to request the status of the printer. The operations (2) and (4) are the same as the third embodiment.

Figure 23:
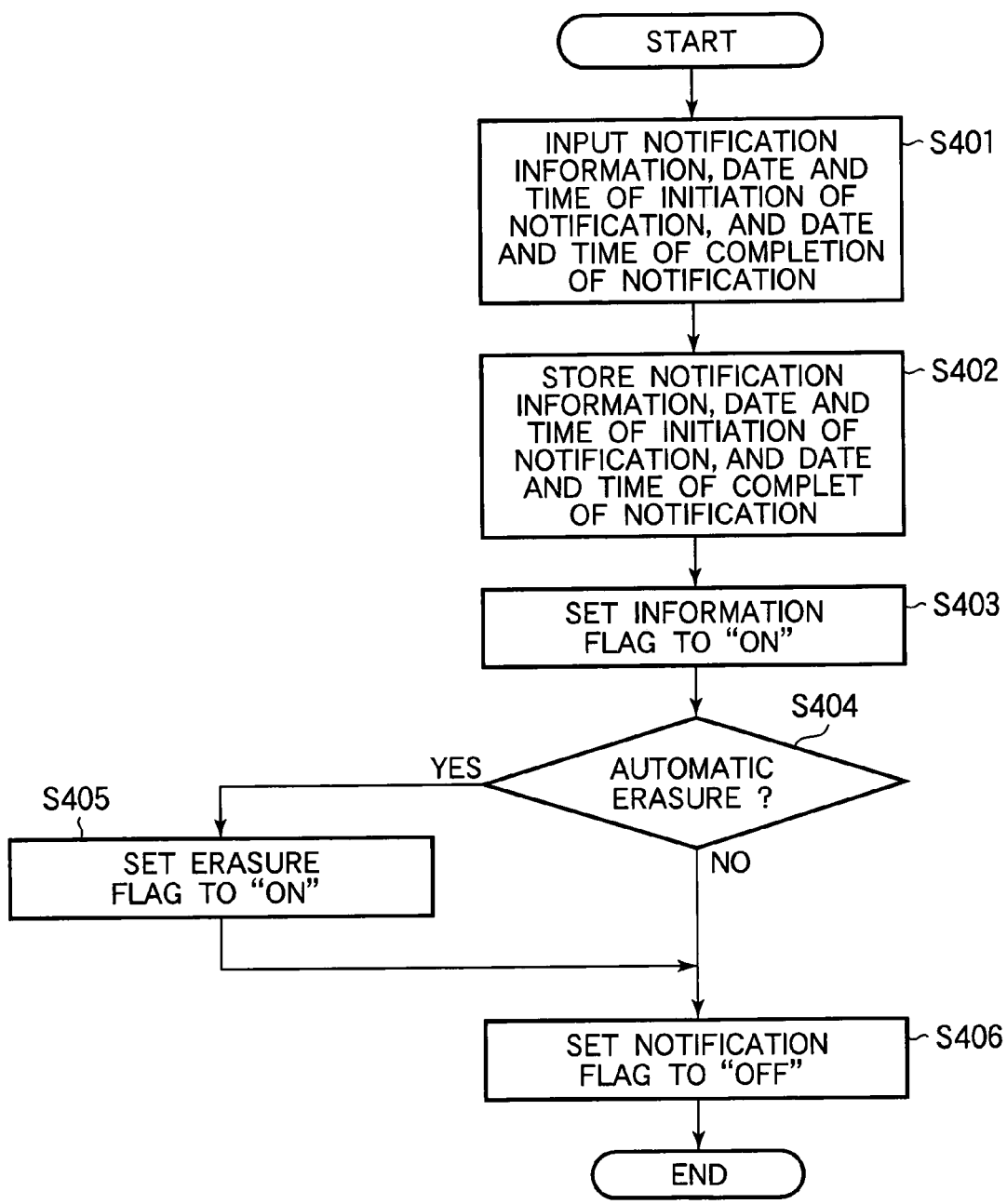
FIG. 23 is a flowchart illustrating the operation for inputting notification information.

FIG. 23 is a flowchart illustrating the operation for inputting notification information. The operation for inputting the notification information will be described with reference to the flowchart in FIG. 23. The notification information, the date and time of initiation of notification, and the date and time of completion of notification are inputted through the input section 101 (step S401). The information response section 402 compares the current date and time generated by the clock 302 with the date and time of completion of notification stored in the notification information storage section 401. If the current time has passed the date and time of completion of notification, the information response section 402 erases the notification information that corresponds to the date and time of completion of notification.

The notification information storage section 102 stores the notification information, the date and time of initiation of notification, and the date and time of completion of notification (step S402).

The notification information management section 403 sets the information flag (step S403) to ON to determine whether the notification information should be automatically erased (step S404). If the automatic erasure is to be performed, i.e., the date and time of completion of notification are inputted, the notification information management section 403 sets the erasure flag (step S411) Thereafter, the terminal management section 2011 resets all of the notification flags to OFF (step S406). This completes the operation for inputting the notification information.

Figure 24:
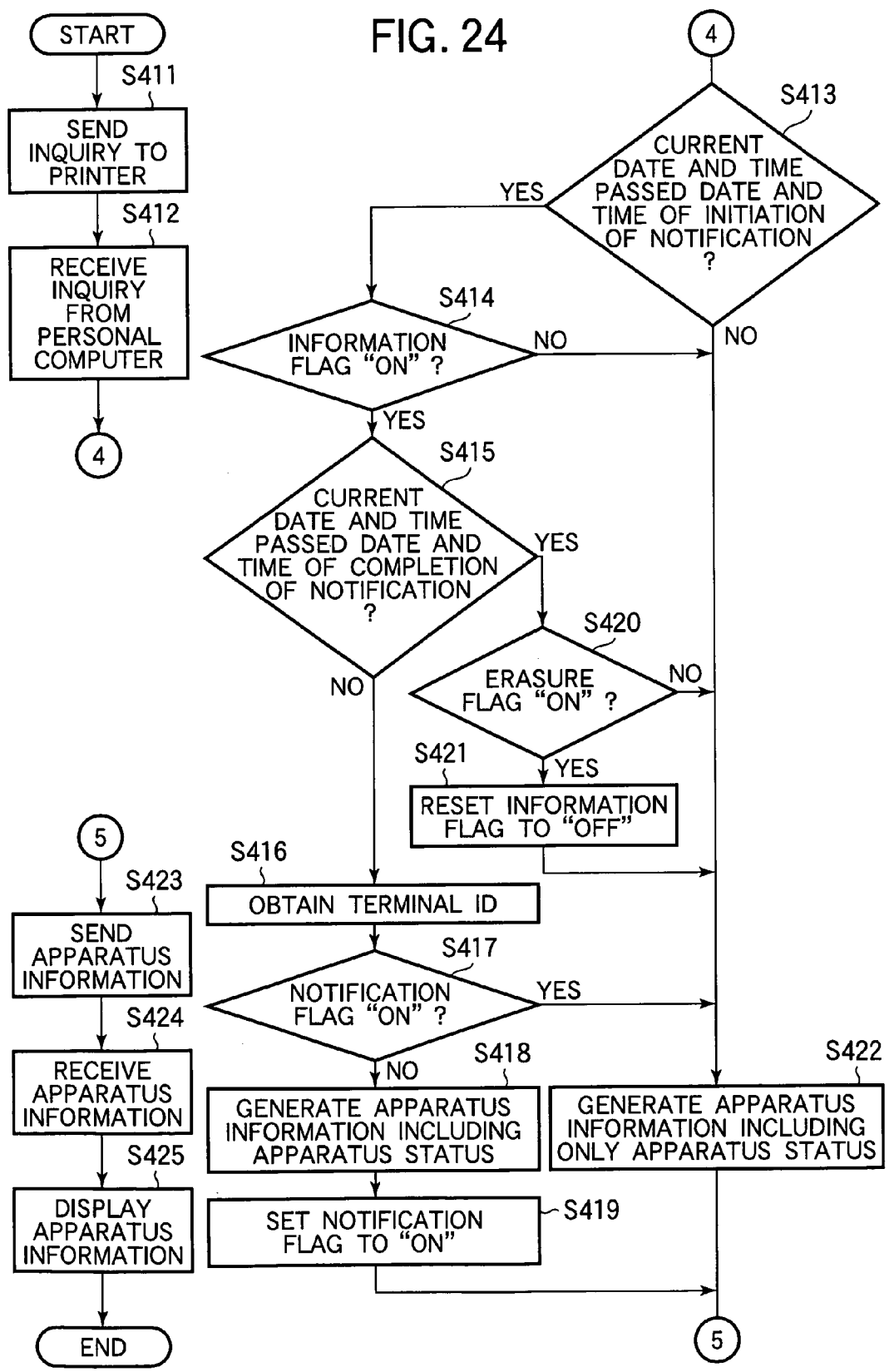
FIG. 24 is a flowchart illustrating the operation for sending an inquiry to request the status of the printer.

FIG. 24 is a flowchart illustrating the operation for sending an inquiry to request the status of the printer 40. The operation for sending an inquiry to request the status of the printer 40, i.e., the operation in which the PC 11 receives the apparatus information from the printer 40 will be described with reference to the flowchart in FIG. 24. An inquiry section 112 sends an inquiry to the printer 40, requesting of the apparatus information (step S411). The inquiry is sent to a response controller 1073 through a communication section 111, a network 14, and a communication section 108. Upon receiving the inquiry, the response controller 1073 requests an information generation section 1072 to generate the apparatus information (step S412).

The decision section 4021 refers to the date and time of initiation of notification stored in the notification information storage section 401 and the current date and time generated by the clock 302, thereby determining whether the current date and time have passed the date and time of initiation of notification (step S413).

If the current date and time have not passed the date and time of initiation of notification, the information generation section 1072 generates the apparatus information containing only the apparatus status (step S422).

If the current date and time have passed the date and time of initiation of notification, the information generation section 1072 sends an inquiry to the decision section 4021, requesting a decision as to what apparatus information should be generated. In response to the inquiry, the decision section 4021 determines whether the information flag is ON (step S414).

If the information flag is OFF, the information generation section 1072 generates the apparatus information containing only the apparatus status (step S422). If the information flag is ON, the decision section determines whether the information flag is ON (step S415).

If the current date and time have passed the date and time of completion of notification, the decision section 4021 determines whether the erasure flag is ON. If the erasure flag is ON, then the notification information management section 403 resets the information flag to OFF and the information generation section 1072 generates the apparatus information including only the apparatus status (step S422).

If the current date and time have passed the date and time of initiation of notification and are before the date and time of completion of notification, the terminal management section 2011 obtains the terminal ID from the communication section 108 to determine whether the notification flag corresponding to the terminal ID is ON (steps S416 and S417). If the notification flag is ON, the information generation section 1072 generates the apparatus information containing only the apparatus status (step S422). If the notification flag is OFF, the information generation section 1072 generates the apparatus information containing the apparatus status and the notification information and then sets the notification flag to ON (steps S418 and S419).

The response controller 1073 sends the thus generated apparatus information to the PC 11 that inquired the status of the printer 40. The inquiry section 112 receives the apparatus information and displays it on the display 113 (steps S423-S425).

Because the notification flag is managed, the same notification information is not sent to the user many times so that the user is freed from the nuisance of receiving the same information repeatedly.

In the fourth embodiment, the date and time of initiation of notification are set. When the current date and time have passed the date and time of initiation of notification, the notification information is sent to the PC 11. This configuration prevents the notification information from being sent to the PC 11 too earlier than a notified event takes place actually.

The notification information and the date and time of initiation of notification are inputted in advance. Therefore, the maintenance personnel are freed from actually inputting the notification information on the date on which the notification information should be sent to the user.

The notification information is automatically erased. Thus, for example, the system is prevented from sending useless notification information, i.e., information on the busy hours of the printer is sent after the busy hours have passed. In addition, the configuration frees the maintenance personnel from the burden of deleting the information that has been sent out.

For the above-described embodiments, the printer transmits the notification information to a PC that sent an inquiry or print data to the printer. Alternatively, the configuration may be modified such that the notification information is sent only to previously registered PCs. If a PC fails to successfully receive the notification information, then when that PC transmits print data or an inquiry requesting of the apparatus information, the printer sends the notification to that PC. Still alternatively, the system may be configured such that when the printer receives print data or an inquiry requesting of the apparatus information from a PC that has not been registered, the printer transmits the notification information to that PC.

The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

What is claimed is:

1. An image forming apparatus coupled to an information processing apparatus via a communication line, the image forming apparatus comprising:
    a status detection section, detecting a status of the image forming apparatus;
    a notification information storage section, storing notification information that should be to be transmitted to the information processing apparatus, the notification information being information associated with the image forming apparatus and being supplied to a user of the image information processing apparatus;
    an information response section, generating apparatus information when the image forming apparatus receives an inquiry from the information processing apparatus, the apparatus information including the status and the notification information;
    wherein the image forming apparatus further includes a status storage section that stores the detected status, a terminal identification for the information processing apparatus and a notification flag that indicates whether the notification information has been sent to the information processing apparatus; wherein if the notification flag indicates that the notification information has been sent to the information processing apparatus, said information response section generates the apparatus information that includes only the status and sends the apparatus information to the information processing apparatus.

2. The image forming apparatus according to claim 1, wherein when said communication section sends the notification information to the information processing apparatus, said communication section sends the notification information together with the status.

3. An image forming system in which an image forming apparatus is coupled to an information processing apparatus via a communication line, wherein the information processing apparatus comprises:
    an inquiry section, sending an inquiry to request apparatus information on the image forming apparatus; and
    wherein the image forming apparatus comprises:
    a status detection section, detecting a status of the image forming apparatus;
    a notification information storage section, storing notification information that should be sent to the information processing apparatus, the notification information being information associated with the image forming apparatus and being supplied to a user of the information processing apparatus;
    an information response section, generating the apparatus information when the image forming apparatus receives the inquiry from the information processing apparatus, the apparatus information including the status and the notification information;
    wherein the image forming apparatus further includes a status storage section that stores the detected status, a terminal identification for the information processing apparatus, and a notification flag that indicates whether the notification information has been sent to the information processing apparatus;
    wherein if the notification flag indicates that the notification information has been sent to the information processing apparatus, said information response section generates the apparatus information that includes only the status and sends the apparatus information to the information processing apparatus.

4. An image forming system in which an image forming apparatus is coupled to an information processing apparatus via a communication line, wherein the information processing apparatus comprises:
    an inquiry section, sending an inquiry to request apparatus information on the image forming apparatus;
    wherein the image forming apparatus comprises:
    a status detection section, detecting a status of the image forming apparatus;
    a status storage section, storing the detected status;
    a notification information storage section, storing notification information that should be sent to the information processing apparatus, the notification information being information associated with the image forming apparatus and being supplied to a user of the information processing apparatus;
    an information response section, generating the apparatus information when the image forming apparatus receives the inquiry from the information processing apparatus, the apparatus information including the status and the notification information;
    wherein said image forming apparatus comprises a clock that generates a current date and a current time;
    wherein said notification information storage section stores the notification information and a date and a time of initiation of notification on which the notification information is to be sent to the information processing apparatus;
    wherein said information response section generates the apparatus information that includes the notification information and the status, the apparatus information being generated after the date and time of initiation of notification and sent to the information processing apparatus.

5. The image forming system according to claim 3, wherein said image forming apparatus comprises a clock that generates a current date and a current time;
    wherein said notification information storage section stores the notification information and a date and a time of initiation of notification on which the notification information should be sent to the information processing apparatus;
    wherein said information response section generates the apparatus information that includes the notification information and the status, the apparatus information being generated after the date and time of initiation of notification and sent to the information processing apparatus.

6. An image forming system in which an image forming apparatus is coupled to an information processing apparatus via a communication line, wherein the information processing apparatus comprises:

an inquiry section, sending an inquiry to request apparatus information on the image forming apparatus;

wherein the image forming apparatus comprises:

a status detection section, detecting a status of the image forming apparatus;

a status storage section, storing the detected status;

a notification information storage section, storing notification information that should be sent to the information processing apparatus, the notification information being information associated with the image forming apparatus and being supplied to a user of the information processing apparatus;

an information response section, generating the apparatus information when the image forming apparatus receives the inquiry from the information processing apparatus, the apparatus information including the status and the notification information;

wherein said image forming apparatus comprises a clock that generates a current date and a current time;

wherein said notification information storage section stores the notification information, a date and a time of initiation of notification on which the notification information should be sent to the information processing apparatus, and a date and a time of completion of notification by which the notification information should have been sent to the information processing apparatus;

wherein when the current date and time are after the date and time of initiation of notification and before the date and time of completion of notification, said information response section generates the apparatus information that includes the notification information and the status, the apparatus information being sent to the information processing apparatus.

7. The image forming system according to claim 3, wherein said image forming apparatus comprises a clock that generates a current date and a current time;

wherein said notification information storage section stores the notification information, a date and a time of initiation of notification on which the notification information should be sent to the information processing apparatus, and a date and a time of completion of notification by which the notification information should have been sent to the information processing apparatus;

wherein when the current date and time are after the date and time of initiation of notification and before the date and time of completion of notification, said information response section generates the apparatus information that includes the notification information and the status, the apparatus information being sent to the information processing apparatus.

8. The image forming system according to claim 6, wherein when the information response section determines that the current date and time have passed the date and time of completion of notification, the notification information in the notification information storage section is erased.

9. The image forming system according to claim 7, wherein when the information response section determines that the current date and time have passed the date and time of completion of notification, the notification information in the notification information storage section is erased.

* * * * *